(12) United States Patent
Chen et al.

(10) Patent No.: US 12,470,705 B2
(45) Date of Patent: Nov. 11, 2025

(54) FRACTIONAL-PEL BLOCK VECTOR FOR VIDEO CODING

(71) Applicant: QUALCOMM Incorporated, San Diego, CA (US)

(72) Inventors: Chun-Chi Chen, San Diego, CA (US); Bappaditya Ray, San Diego, CA (US); Hongtao Wang, San Diego, CA (US); Vadim Seregin, San Diego, CA (US); Marta Karczewicz, San Diego, CA (US); Han Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 18/408,928

(22) Filed: Jan. 10, 2024

(65) Prior Publication Data

US 2024/0244197 A1    Jul. 18, 2024

Related U.S. Application Data

(60) Provisional application No. 63/493,093, filed on Mar. 30, 2023, provisional application No. 63/479,720, filed on Jan. 12, 2023.

(51) Int. Cl.
*H04N 19/00* (2014.01)
*H04N 19/117* (2014.01)
(Continued)

(52) U.S. Cl.
CPC ......... *H04N 19/117* (2014.11); *H04N 19/159* (2014.11); *H04N 19/176* (2014.11);
(Continued)

(58) Field of Classification Search
None
See application file for complete search history.

(56) References Cited

U.S. PATENT DOCUMENTS

2015/0237357 A1\* 8/2015 Alshin ................. H04N 19/182
  375/240.16
2016/0337662 A1\* 11/2016 Pang .................... H04N 19/523
(Continued)

FOREIGN PATENT DOCUMENTS

WO    2021030502 A1    2/2021

OTHER PUBLICATIONS

Bross B., et al., "Versatile Video Coding Editorial Refinements on Draft 10", JVET-T2001-v2, 20th JVET Meeting, Oct. 7, 2020-Oct. 16, 2020, Teleconference, (The Joint Video Experts Team of ITU-T SG 16 WP 3 and ISO/IEC JTC 1/SC 29), Nov. 24, 2020, pp. 1-515, XP030293334, cited in the application section 9.3.3.2.
(Continued)

*Primary Examiner* — Zhihan Zhou
(74) *Attorney, Agent, or Firm* — Shumaker & Sieffert, P. A.

(57) ABSTRACT

A method of encoding or decoding video data includes determining a block vector for a current block of a current picture, the block vector identifying a fractional-pel position between reference samples in the current picture and having a fractional-pel resolution that is less than integer-pel resolution; generating a prediction block from reference samples in the current picture based on the fractional-pel position; and encoding or decoding the current block based on the prediction block.

19 Claims, 11 Drawing Sheets

(51) Int. Cl.
*H04N 19/159* (2014.01)
*H04N 19/176* (2014.01)
*H04N 19/186* (2014.01)
*H04N 19/70* (2014.01)
*H04N 19/80* (2014.01)

(52) U.S. Cl.
CPC ........... *H04N 19/186* (2014.11); *H04N 19/70* (2014.11); *H04N 19/80* (2014.11)

(56) References Cited

U.S. PATENT DOCUMENTS

| | | | |
|---|---|---|---|
| 2018/0048909 A1* | 2/2018 | Liu | H04N 19/105 |
| 2022/0210441 A1* | 6/2022 | Xu | H04N 19/105 |
| 2024/0236367 A1* | 7/2024 | Chen | H04N 19/523 |
| 2024/0291997 A1* | 8/2024 | Zhang | H04N 19/107 |

OTHER PUBLICATIONS

Browne A., et al., "Algorithm Description for Versatile Video Coding and Test Model 198 (VTM198)", JVET-AC2002-v1, Joint Video Experts Team (JVET) of ITU-T SG 16 WP 3 and ISO/IEC JTC 1/SC 29 29th Meeting Teleconference, Jan. 11-20, 2023, pp. 1-138.

Chen C.C., et al., "EE2-1.8/1.9: IBC Adaptation for Coding of Natural Content", JVET-AD0208-v2, Joint Video Experts Team (JVET) of ITU-T SG 16 WP 3 and ISO/IEC JTC 1/SC 29 30th Meeting, Antalya, Apr. 21-28, 2023, pp. 1-4.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

Chen W., et al., "Non-EE2: IBC With Fractional Block Vectors", JVET-AC0172-v3, Joint Video Experts Team (JVET) of ITU-T SG 16 WP 3 and ISO/IEC JTC 1/SC 29 29th Meeting, by Teleconference, Jan. 11-20, 2023, pp. 1-3.

Chen Y-W., et al., "Description of SDR, HDR and 360° Video Coding Technology Proposal by Qualcomm and Technicolor—Low and High Complexity Versions", Joint Video Exploration Team (JVET) of ITU-T SG 16 WP 3 and ISO/IEC JTC 1/SC 29/WG 11, JVET-J0021, 10th Meeting, San Diego, US, Apr. 10, 2018-Apr. 20, 2018, No. JVET-J0021, Apr. 14, 2018, pp. 1-44, XP030248214, Paragraph [2.8.1], Figure 10.

Coban M., et al., "Algorithm Description of Enhanced Compression Model 7 (ECM 7)", JVET-AB2025, Joint Video Experts Team (JVET) of ITU-T SG 16 WP 3 and ISO/IEC JTC 1/SC 29, 28th Meeting, Mainz, DE, Oct. 20-28, 2022, 62 Pages, Dec. 22, 2022, XP030306363, paragraphs 3.1.5.1, 3.3.5, 03.4, paragraphs [3.1.14], 3.2.16-0020, figure 14.

Coban M., et al., "Algorithm Description of Enhanced Compression Model 8 (ECM 8)", JVET-AC2025, Joint Video Experts Team (JVET) of ITU-T SG 16 WP 3 and ISO/IEC JTC 1/SC 29, 29th Meeting, by teleconference, Jan. 11-20, 2023, pp. 1-74.

International Search Report and Written Opinion—PCT/US2024/011250—ISA/EPO—Mar. 20, 2024 (11 pp).

Itu-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Itu-T H.266: "Series H: Audiovisual and Multimedia Systems Infrastructure of Audiovisual Services—Coding of Moving Video", Versatile Video Coding, The International Telecommunication Union, Aug. 2020, 516 pages.

Lee Y., et al., "Study of Sub-pel Block Vector for Intra Block Copy", Proceedings vol. 12177, International Workshop on Advanced Imaging Technology, Proceedings of the SPIE, vol. 12177, Apr. 30, 2022, 6 Pages, sections 2.1-2.3, 3.1, 3.2.

Li X., et al., "Non-EE2: Intra TMP with half-pel Precision", 29. JVET Meeting, Jan. 11, 2023-Jan. 20, 2023, Teleconference, (The Joint Video Exploration Team of ISO/IEC JTC1/SC29/WG11 and ITU-T SG. 16 ), No. JVET-AC0087, m61660, Jan. 4, 2023, pp. 1-3, section 2.

Ray B., et al., "Non-EE2: IBC Adaptation for Coding of Natural Content", JVET-AC0161-v4, Joint Video Experts Team (JVET) of ITU-T SG 16 WP 3 and ISO/IEC JTC 1/SC 29 29th Meeting, by teleconference, Jan. 11-20, 2023, pp. 1-4.

Seregin V., et al., "Exploration Experiment on Enhanced Compression Beyond VVC Capability (EE2)", Joint Video Experts Team (JVET) of ITU-T SG 16 WP 3 and ISO/IEC JTC 1/SC 29, JVET-AC2024-v2, 29th Meeting, by teleconference, Jan. 11-20, 2023, pp. 1-30.

Seregin V., et al., "Exploration Experiment on Enhanced Compression beyond VVC capability (EE2)", JVET-AD2024-v2, Joint Video Experts Team (JVET) of ITU-T SG 16 WP 3 and ISO/IEC JTC 1/SC 29 30th Meeting, Antalya, TR, Apr. 21-28, 2023, pp. 1-15.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, 20120101, 20 Pages.

Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, No. JCTVC-N1003_v1, 14th Meeting, Vienna, AT, Jul. 25-Aug. 2, 2013, 311 Pages, Please consider section 8.5.3.2.6 on p. 125, section 8.5.3.2.7 on pp. 126-129, and section 8.5.3.2.8 on pp. 129 and 130, XP002787691, p. 89-94.

Xie X., et al., "Efficient Interpolation Filters for Chroma Motion Compensation in Video Coding", IEEE International Conference on Visual Communications and Image Processing, 2022, Dec. 13, 2022, 5 Pages, section I.

* cited by examiner

FRACTIONAL-PEL BLOCK VECTOR FOR VIDEO CODING

This application claims the benefit of U.S. Provisional Application No. 63/479,720, filed Jan. 12, 2023, and U.S. Provisional Application No. 63/493,093, filed Mar. 30, 2023, the entire contents of each of which are incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques Intra Block Copy (IBC) and Intra Template Matching (IntraTMP) techniques with the support of fractional-pel block vectors. The disclosed methods can be applied to any of the existing video codecs, such as HEVC (High Efficiency Video Coding), VVC (Versatile Video Coding), Essential Video Coding (EVC) or be an efficient coding feature in future video coding standards (e.g., ECM (Enhanced Compression Model)).

As described in more detail, in one or more examples, a block vector (e.g., a vector for a current block that identifies a location in the same picture as a current block) may have fractional-pel resolution, meaning that the block vector identifies a location between samples in the current picture. By having fractional-pel resolution block vectors, the example techniques may allow for IBC and/or IntraTMP to be used for natural content, in addition to screen content, thus providing for additional coding modes to further increase coding efficiency.

In one example, the disclosure describes a method of encoding or decoding video data, the method comprising: determining a block vector for a current block of a current picture, the block vector identifying a fractional-pel position between reference samples in the current picture and having a fractional-pel resolution that is less than integer-pel resolution; generating a prediction block from reference samples in the current picture based on the fractional-pel position; and encoding or decoding the current block based on the prediction block.

In one example, the disclosure describes a device for encoding or decoding video data, the device comprising: one or more memories configured to store the video data; and processing circuitry coupled to the one or more memories, wherein the processing circuitry is configured to: determine a block vector for a current block of a current picture of the video data, the block vector identifying a fractional-pel position between reference samples in the current picture and having a fractional-pel resolution that is less than integer-pel resolution; generate a prediction block from reference samples in the current picture based on the fractional-pel position; and encode or decode the current block based on the prediction block.

In one example, the disclosure describes a computer-readable storage medium storing instructions thereon that when executed cause one or more processors to: determine a block vector for a current block of a current picture, the block vector identifying a fractional-pel position between reference samples in the current picture and having a fractional-pel resolution that is less than integer-pel resolution; generate a prediction block from reference samples in the current picture based on the fractional-pel position; and encode or decode the current block based on the prediction block.

The details of one or more examples are set forth in the accompanying drawings and the description below. Other features, objects, and advantages will be apparent from the description, drawings, and claims.

DETAILED DESCRIPTION

Figure 1:
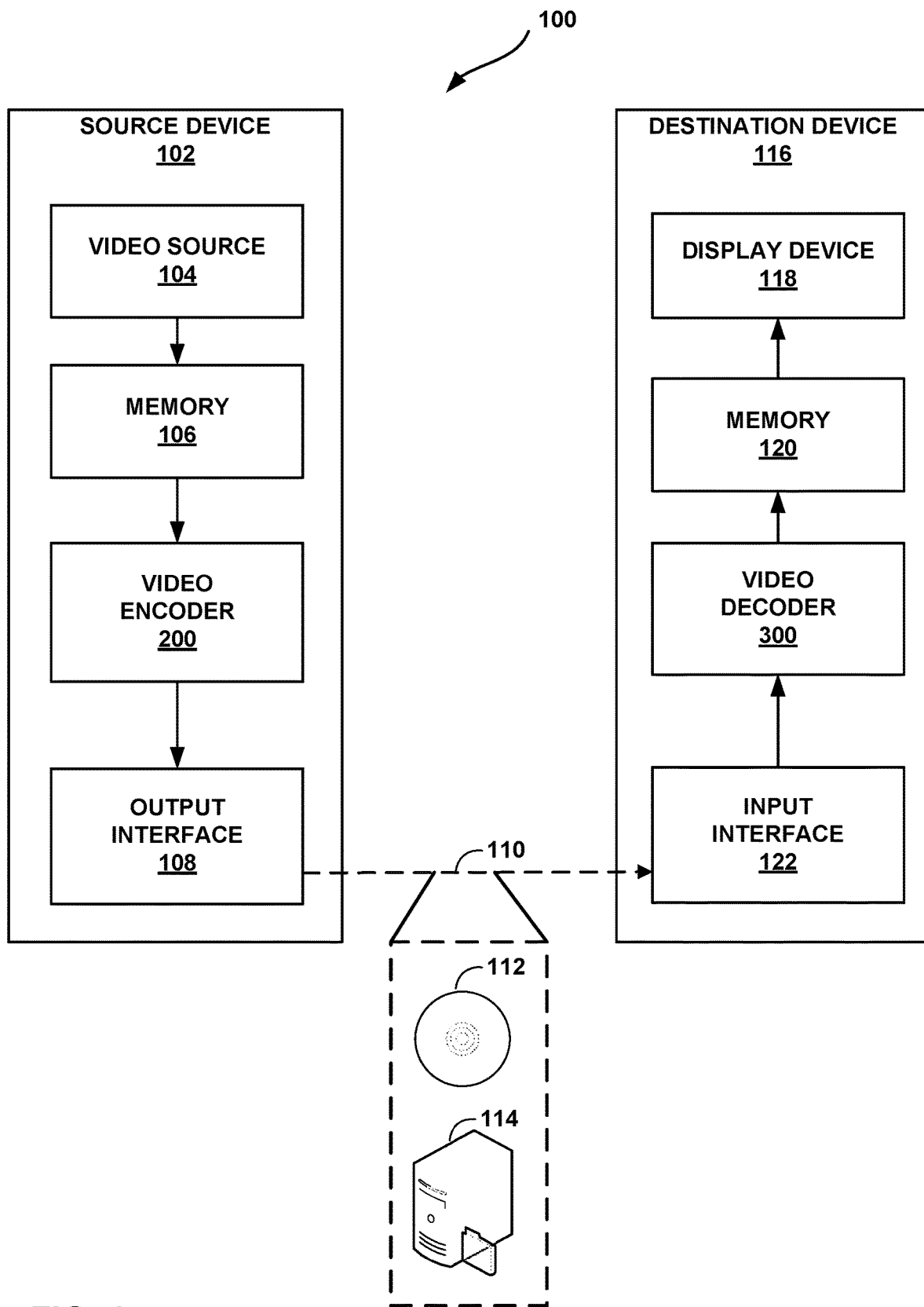
FIG. 1 is a block diagram illustrating an example video encoding and decoding system that may perform the techniques of this disclosure.

In video coding, a video encoder determines a prediction block for a current block based on one or more reference samples. The video encoder determines residual information indicative of a difference between the current block and the prediction block, and signals the residual information. A video decoder determines a prediction block for the current block using the same techniques as the video encoder. The video decoder sums the prediction block and the residual information to reconstruct the current block.

One example way of determining a prediction block is from reference samples in a different picture than the current block or from reference samples in the same picture as the current block. For instance, for inter-prediction, the video encoder may determine a motion vector that identifies a position in a reference picture. From the identified position, the video encoder may determine the prediction block. The video encoder may signal information to the video decoder that the video decoder uses to determine the motion vector and the reference picture so that the video decoder can determine the prediction block in the same way as the video encoder.

Intra-block copy (IBC) and intra template matching (IntraTMP) are example video coding modes in which the prediction block is determined from reference samples in the same picture as the current block. For instance, the video encoder may determine a block vector that identifies a location within the current picture. Similar to inter-prediction, from the identified position, the video encoder may determine the prediction block. The video encoder may signal information to the video decoder that the video decoder uses to determine the block vector so that the video decoder can determine the prediction block in the same way as the video encoder.

IBC and IntraTMP modes may generally be used for screen content, which are usually rendered at integer grid with sharp signals. Accordingly, the block vectors for IBC and IntraTMP modes may have integer-pel resolution (e.g., 1-pel or 4-pel resolution). With integer-pel resolution, the block vector identifies a location in the current picture having the current block where a reference sample is located.

There may be benefits of using IBC or IntraTMP modes for content in addition to screen content. However, block vectors having integer-pel resolution may limit the coding gains for IBC or IntraTMP for content other than screen content. Accordingly, this disclosure describes examples of determining a block vector for a current block of a current picture. In one or more examples, the block vector identifies a fractional-pel position between samples in the current picture and has a fractional-pel resolution that is less than integer-pel resolution. For instance, rather than the block vector pointing to a sample in the current picture, the block vector may point to a position between samples. Examples of the fractional-pel resolution include half-pel, quarter-pel, eighth-pel, and so forth.

In this way, the example techniques allow for benefits of video coding using block vectors but for non-screen content, such as natural content. IBC or IntraTMP are used as examples, and the techniques are not limited to IBC or IntraTMP, and can be extended generally to block vectors having fractional-pel resolution.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for fractional-pel block vector for video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for fractional-pel block vector for video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format.

In general, video encoder 200 and video decoder 300 may be configured to perform the techniques of this disclosure in conjunction with any video coding techniques that use block vectors such as in intra-block copy (IBC) mode or intra template matching (IntraTMP) mode, as two non-limiting examples. Block vectors refer to vectors that identify a position (e.g., point to a position) in the same picture as the block that is being encoded or decoded. Some techniques limited block vectors to integer-pel resolution. While integer-pel resolution may function well for screen content coding, integer-pel resolution block vectors may not provide limited coding gains for non-screen content coding.

However, there may be benefits of using reference samples in the same picture as the current picture for prediction of a current block. As described in more detail, this disclosure describes examples of having block vectors with fractional-pel resolution (e.g., the block vectors point to positions between samples in the picture, rather than to positions where a sample is located). Accordingly, the example techniques provide for coding gains associated with use of block vectors, while minimizing coding inefficiencies from limiting block vectors to integer-pel resolutions (e.g., where the block vector points to a position where a sample in the picture is located).

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, as described in more detail, video encoder 200 and video decoder 300 may determine a block vector for a current block of a current picture. The block vector may identify a fractional-pel position between samples in the current picture and have a fractional-pel resolution that is less than integer-pel resolution. Video encoder 200 and video decoder 300 may generate a prediction block from reference samples in the current picture based on the fractional-pel position, and encode or decode the current block based on the prediction block.

Prior to describing example techniques of using block vectors having fractional-pel resolution, the following describes examples of video coding techniques. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/14_Vienna/wg11/JCTVC-N1003-v1.zip ITU-T VCEG (Q6/16) and ISO/IEC MPEG (JTC 1/SC 29/WG 11) studied the potential need for standardization of future video coding technology with a compression capability that significantly exceeds that of the current HEVC standard (including its current extensions and near-term extensions for screen content coding and high-dynamic-range coding). The groups worked together on this exploration activity in a joint collaboration effort known as the Joint Video Exploration Team (JVET) to evaluate compression technology designs proposed by their experts in this area. The latest version of reference software, i.e., VVC Test Model 19 (VTM-19.0) could be downloaded from: https://vcgit.hhi.fraunhofer.de/jvet/VVCSoftware_VTM The Versatile Video Coding (VVC) draft specification could be referred to JVET-T2001: "Versatile Video Coding Editorial Refinements on Draft 10" by Bross et al. Joint Video Experts Team (JVET) of ITU-T SG 16 WP 3 and ISO/IEC JTC 1/SC 29 $20^{th}$ Meeting, by teleconference, 7-16 Oct. 2020. Algorithm description of Versatile Video Coding and Test Model 10 (VTM 10.0) could be referred to JVET-T2002: "Algorithm description for Versatile Video Coding and Test Model 11 (VTM 11)" by Chen et al. Joint Video Experts Team (JVET) of ITU-T SG 16 WP 3 and ISO/IEC JTC 1/SC 29 $20^{th}$ Meeting, by teleconference, 7-16 Oct. 2020. Algorithm description of Enhanced Compression Model 7 (ECM-7.0) could be referred to JVET-AB2025: "Algorithm description of Enhanced Compression Model 7 (ECM 7)" by Coban et al. Joint Video Experts Team (JVET) of ITU-T SG 16 WP 3 and ISO/IEC JTC 1/SC 29 $28^{th}$ Meeting, Mainz, DE, 20-28 Oct. 2022.

Figure 6:
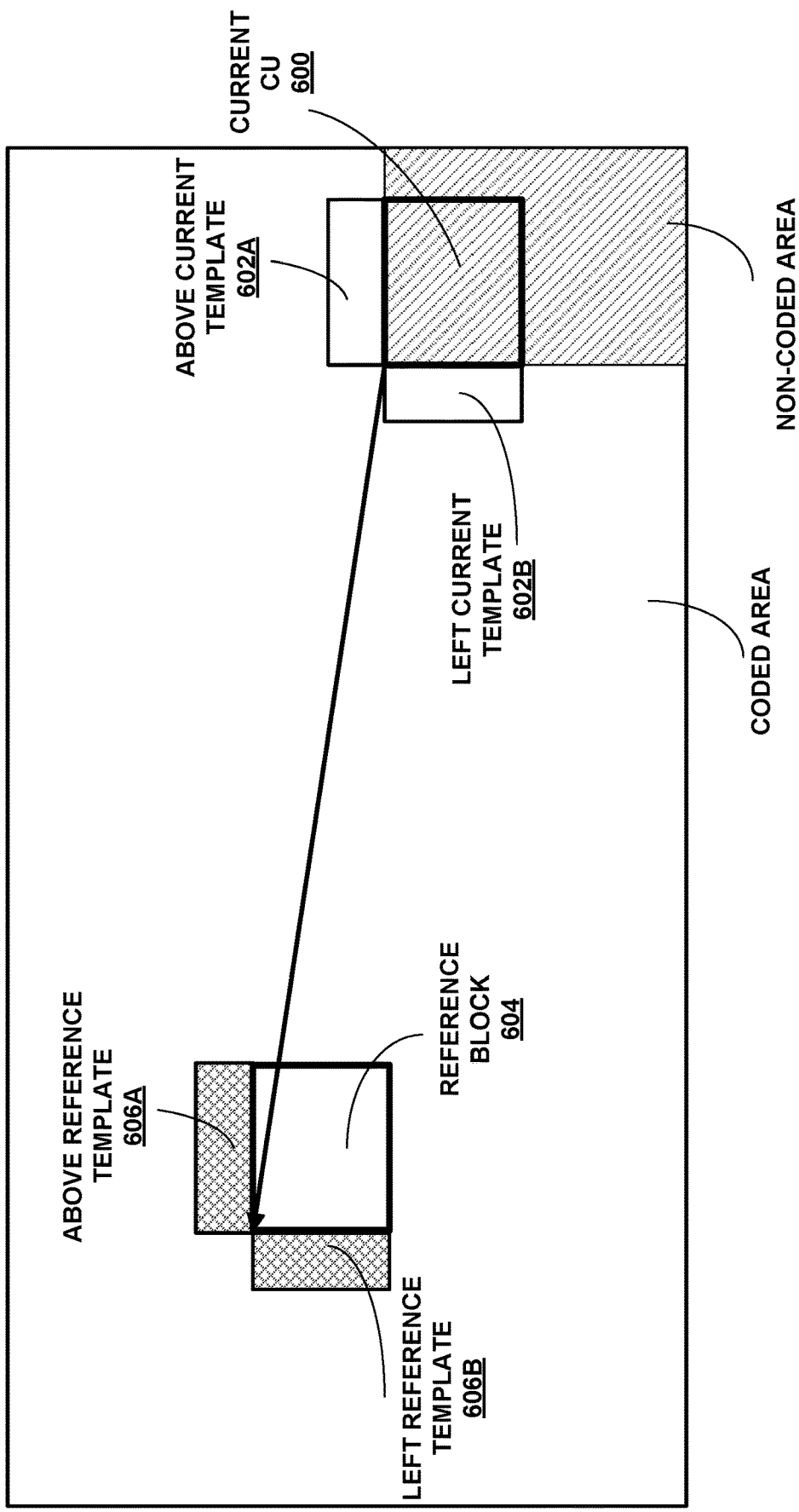
FIG. 6 is a conceptual diagram illustrating an example of intra-block copy (IBC).

The following describes intra block copy (IBC) for intra prediction. Intra Block Copy (IBC) is one of the coding tools for screen content. For the current coding unit (CU), IBC will search all block vectors and find the best matching block in the reference region as prediction as shown in FIG. 6. Then, a prediction of the chosen block vector is generated and the difference between the chosen block vector and the predicted block vector, known as block vector difference (BVD), is signaled in the bitstream.

FIG. 6 is a conceptual diagram illustrating an example of intra-block copy (IBC). FIG. 6 illustrates current CU 600 having an above current template 602A and a left current template 602B. Current CU 600 is part of non-coded area (e.g., yet to encoded or decoded) of a current picture, and the coded area (e.g., already encoded or decoded) of the same current picture includes reference block 604 having above reference template 606A and left reference template 606B. Video encoder 200 and video decoder 300 may compare templates 602 and 606 (e.g., determine a difference in the templates). Video encoder 200 and video decoder 300 may determine another block vector that identifies another reference block with another set of templates, and compare those templates to template 602. Video encoder 200 and video decoder 300 may repeat such operations until the minimum difference is found, and determine the block vector as the vector that resulted in the minimum difference in the templates. The above example technique of template matching may be for block vector refinement.

For instance, in some examples, video encoder 200 may determine a block vector for current CU 600, and signal information to video decoder 300 to determine the block vector. In this example, if block vector refinement is appropriate, video encoder 200 and video decoder 300 may perform the above example techniques for FIG. 6.

As another example, video encoder 200 and video decoder 300 may each construct a candidate list of block vector predictors, which may be block vectors or derived from block vectors of neighboring or proximate blocks to current CU 600. Video encoder 200 may signal and video decoder 300 may receive an index into the candidate list of block vector predictors to determine a block vector predictor. If IBC-merge mode is enabled, then video decoder 300 may set the block vector predictor as the block vector for current CU 600, and may optionally perform block vector refinement using the example techniques of FIG. 6 to refine the block vector for current CU 600. If IBC-advanced motion vector prediction (IBC-AMPV) mode is enabled, then video encoder 200 may further signal a block vector difference (BVD) between the block vector predictor and the actual block vector for current CU 600. Video decoder 300 may add the BVD to the block vector predictor to determine the block vector for current CU 600. Video decoder 300 may then optionally perform block vector refinement using the example techniques of FIG. 6 to refine the block vector for current CU 600.

The following describes template matching related tools. Template matching tools may include template matching (TM)-advance motion vector prediction (AMVP) and TM-merge (MRG) for inter prediction and IBC. Template matching (TM) is a decoder-side MV derivation method to refine the motion information of the current CU by finding the closest match between a template (i.e., top and/or left neighbouring blocks of the current CU) in the current picture and a block (i.e., same size to the template) in a reference picture. TM may be applied to both AMVP and regular merge mode called respectively as TM-AMVP and TM-MRG modes. Similarly, the same TM can also be applied to IBC AMVP and IBC Merge mode. One difference between Inter TM and IBC TM is that the reference picture of inter-prediction is the reconstructed area in the current frame in IBC. Without loss of generality, this disclosure generally use "MV" or "motion" to represent that current CU is an Inter block and has motion information or that the current CU is an IBC block and has block vector information.

Figure 7:
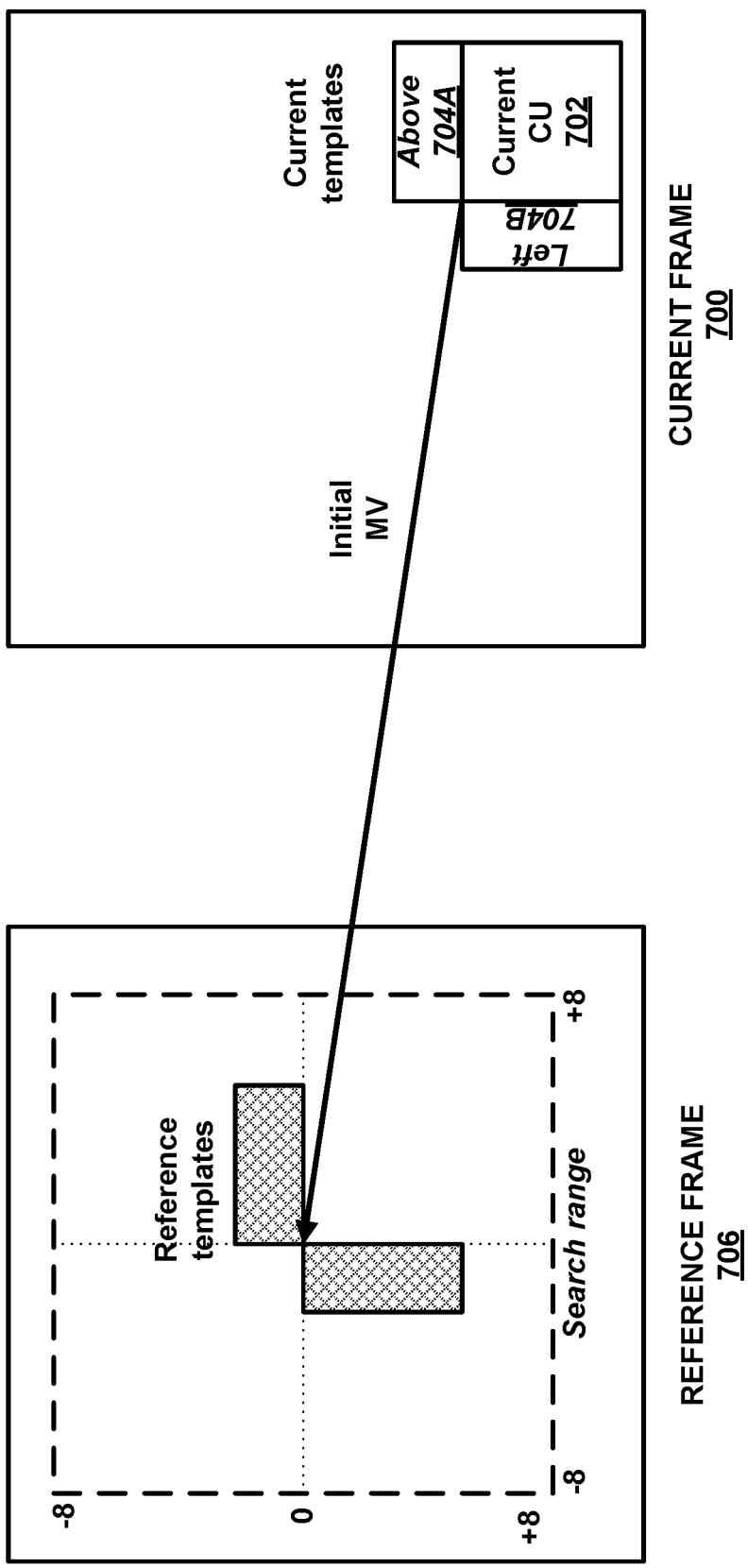
FIG. 7 is a conceptual diagram illustrating an example of template matching on a search area around an initial motion vector (MV).

As illustrated in FIG. 7, a better MV is searched around the initial motion of the current CU within a [−8, +8]-pel search range. The template matching method in JVET-J0021: "Description of SDR, HDR and 360° video coding technology proposal by Qualcomm and Technicolor—low and high complexity versions" by Chen et al. Joint Video Exploration Team (JVET) of ITU-T SG 16 WP 3 and ISO/IEC JTC 1/SC 29/WG 11 10$^{th}$ Meeting: San Diego, US, 10-20 Apr. 2018 is used with the following modifications: search step size is determined based on AMVR (adaptive motion vector resolution) mode and TM can be cascaded with bilateral matching process in merge modes.

FIG. 7 is a conceptual diagram illustrating an example of template matching on a search area around an initial motion vector (MV). For instance, FIG. 7 illustrates current frame 700 and reference frame 706. Current frame 700 includes current CU 702 having above template 704A and left template 704B. An initial motion vector points to reference templates within reference frame 706, and the initial motion vector may be updated by evaluating within the search range for reference templates that better match above template 704A and left template 704B. Rather than having a reference frame 706, similar techniques may be applied to IBC where the search range is within current frame 700.

In TM-AMVP mode, an MVP candidate is determined based on template matching error to select the one MVP candidate which reaches the minimum difference between the current block template and the reference block template, and then TM is performed only for this particular MVP candidate for MV refinement. TM refines this MVP candidate, starting from full-pel MVD precision (or 4-pel for 4-pel AMVR (adaptive motion vector resolution) mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in the table below. This search process may ensure that the MVP candidate keeps the same MV precision as indicated by the AMVR mode after TM process. In the search process, if the difference between the previous minimum cost and the current minimum cost in the iteration is less than a threshold that is equal to the area of the block, the search process terminates.

TABLE 1

Search patterns of AMVR and merge mode with AMVR.

| Search pattern | AMVR mode | | | Merge mode | |
| --- | --- | --- | --- | --- | --- |
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In TM-MRG merge mode, a similar search method is applied to the merge candidate indicated by the merge index. As Table 1 shows, TM may be performed all the way down to ⅛-pel MVD precision or skipping those beyond half-pel MVD precision, depending on whether the alternative interpolation filter (that is used when AMVR is of half-pel mode) is used according to merged motion information. When TM mode is enabled, template matching may work as an independent process or an extra MV refinement process between block-based and subblock-based bilateral matching (BM) methods, depending on whether BM can be enabled or not according to its enabling condition check.

The following describes IntraTMP for Intra Prediction. Intra template matching prediction (IntraTMP) is a special intra prediction mode that copies the best prediction block from the reconstructed part of the current frame, whose L-shaped template matches the current template. For a predefined search range, video encoder 200 searches for the most similar template to the current template in a reconstructed part of the current frame and uses the corresponding block as a prediction block. Video encoder 200 then signals the usage of this mode, and the same prediction operation is performed at the decoder side by video decoder 300.

Figure 8:
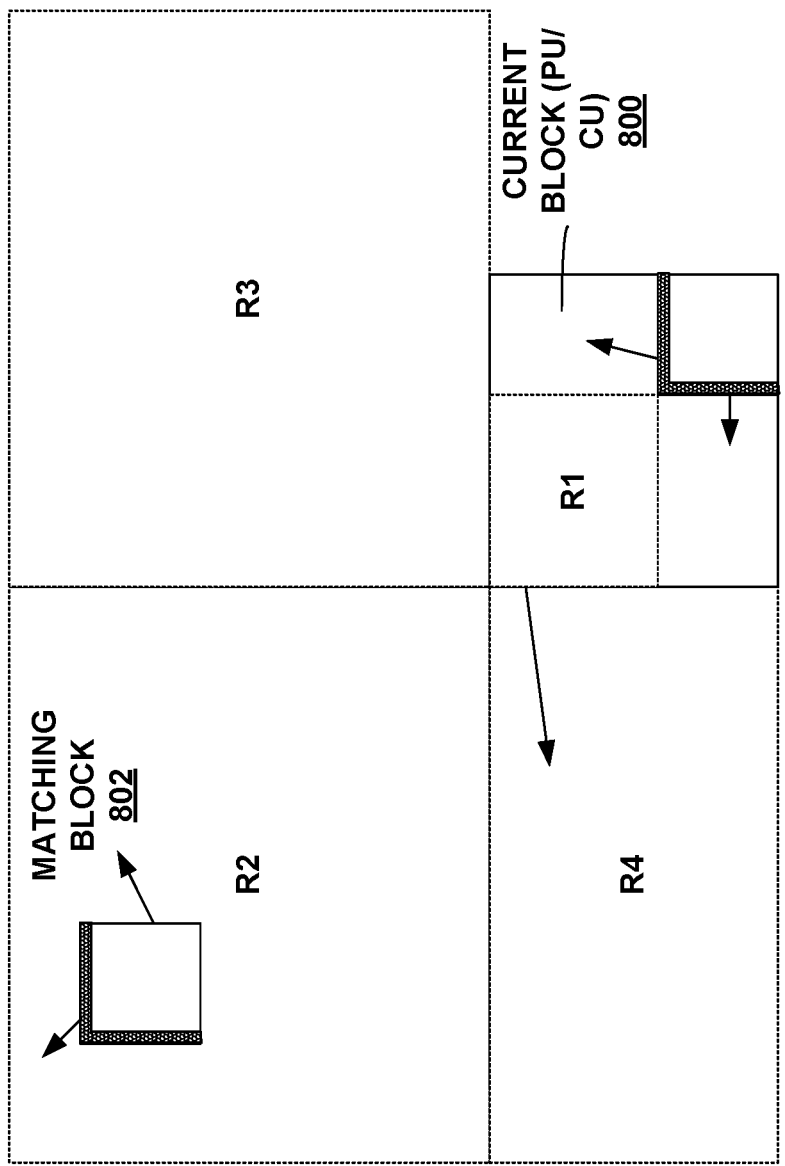
FIG. 8 is a conceptual diagram illustrating an example of intra template matching search area that is used.
Figure 9A:
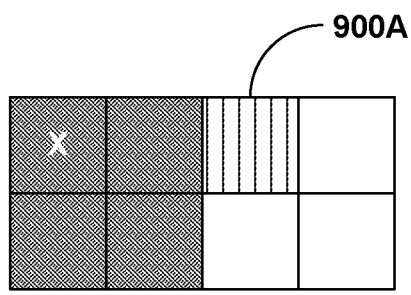
FIGS. 9A-9D are conceptual diagrams illustrating examples of intra-block copy (IBC) reference region depending on current coding unit (CU) position.
Figure 9B:
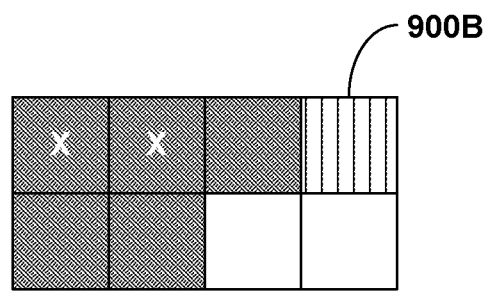
Figure 9C:
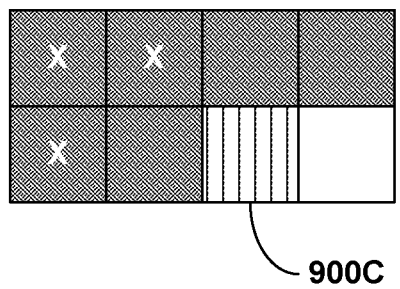
Figure 9D:
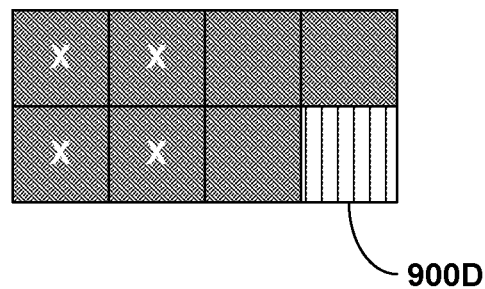

The prediction signal is generated by matching the L-shaped causal neighbor of the current block with another block in a predefined search area in FIG. 8 include: R1: current CTU, R2: top-left CTU, R3: above CTU, R4: left CTU, SAD is used as a cost function. FIG. 8 is a conceptual diagram illustrating an example of intra template matching search area that is used. For instance, FIG. 8 illustrates current block 800 and matching block 802 referred to by a block vector in region R2.

Within each region, video decoder 300 searches for the template that has least SAD with respect to the current one and uses its corresponding block as a prediction block. The dimensions of all regions (SearchRange_w, SearchRange_h) are set proportional to the block dimension (BlkW, BlkH) to have a fixed number of SAD comparisons per pixel. That is: SearchRange_w=5*BlkW and SearchRange_h=5*BlkH.

The Intra template matching tool is enabled for CUs with size less than or equal to 64 in width and height. This maximum CU size for Intra template matching is configurable. The Intra template matching prediction mode is signaled at CU level through a dedicated flag when DIMD (decoder-side intra mode derivation) is not used for current CU.

The following describes IBC-TM-AMVP and IBC-TM-MRG for Intra Prediction. Template Matching is used in IBC for both IBC merge mode and IBC AMVP mode, called respectively as IBC-TM-AMVP and IBC-TM-MRG.

In IBC-TM-MRG, the merge list is modified compared to the one used by regular IBC merge mode such that the candidates are selected according to a pruning method with a motion distance between the candidates as in the regular TM merge mode. The ending zero motion fulfillment is replaced by motion vectors to the left (−W, 0), top (0, −H) and top-left (−W, −H), where W is the width and H the height of the current CU. In addition, the selected candidates are refined with the Template Matching method prior to the RDO (rate-distortion optimization) or decoding process. The IBC-TM-MRG mode has been put in competition with the regular IBC merge mode and a TM-merge flag is signaled.

In the IBC-TM-AMVP mode, up to 3 candidates are selected from the IBC-TM-MRG merge list. Each of those 3 selected candidates are refined using the Template Matching method and sorted according to their resulting Template Matching cost. In some examples, only the first two are then considered in the motion estimation process.

The Template Matching refinement for both IBC-TM merge and AMVP modes may be based on IBC motion vectors being constrained (i) to be integer and (ii) within a reference region as shown in FIGS. 9A-9D. FIGS. 9A-9D are conceptual diagrams illustrating examples of intra-block copy (IBC) reference region depending on current coding unit (CU) 900A-900D position.

In IBC-TM-MRG mode, refinements (e.g., all refinements) are performed at integer precision, and in IBC-TM-AMVP mode, refinements performed either at integer or 4-pel precision depending on the AMVR value. In one or more examples, such a refinement accesses only to samples without interpolation. In both cases, the refined motion vectors and the used template in each refinement step may respect the constraint of the reference region.

An IBC-TM-MRG coded block may not inherit the flip type from a RR-IBC (Reconstruction-Reordered IBC) coded neighbor block. An IBC-TM-AMVP coded block can also be a RR-IBC coded block with a horizontal or vertical flip type, and template matching may not apply in such case.

The following describes IBC merge mode with block vector differences (IBC-MBVD) for Intra Prediction. Affine-MMVD and GPM-MMVD have been adopted to ECM as an extension of regular MMVD mode. It may be possible to extend the MMVD mode to the IBC merge mode.

In IBC-MBVD, the distance set is {1-pel, 2-pel, 4-pel, 8-pel, 12-pel, 16-pel, 24-pel, 32-pel, 40-pel, 48-pel, 56-pel, 64-pel, 72-pel, 80-pel, 88-pel, 96-pel, 104-pel, 112-pel, 120-pel, 128-pel}, and the BVD directions are two horizontal and two vertical directions.

The base candidates are selected from the first five candidates in the reordered IBC merge list. Based on the SAD cost between the template (one row above and one column left to the current block) and its reference for each refinement position, all the possible MBVD refinement positions (20×4) for each base candidate are reordered. Finally, the top 8 refinement positions with the lowest template SAD costs are kept as available positions, consequently for MBVD index coding. The MBVD index is binarized by the rice code with the parameter equal to 1. An IBC-MBVD coded block does not inherit the flip type from a RR-IBC coded neighbor block.

There may be certain issues with block vectors. IBC was generally considered as a specialized coding tool for screen contents. Screen contents are usually rendered at integer grid with sharp signals, and thus IBC generally works with integer-pel block vector precision (or higher, such as, 4-pel block vector precision). However, when IBC is used for coding of nature content, the limitation imposed on BV (block vector) to support only integer-pel precision may become a major performance bottleneck on IBC, since repetitive patterns may not always sit exactly on grid samples.

To address one or more of such issues, this disclosure describes examples of extending IBC to supporting BV's pointing to fractional-pel positions on its reference picture (i.e., the reconstructed area of the current frame). For instance, video encoder 200 and video decoder 300 may be configured to determine a block vector for a current block of a current picture, the block vector identifying a fractional-pel position between samples in the current picture and having a fractional-pel resolution that is less than integer-pel resolution, generate a prediction block from reference samples in the current picture based on the fractional-pel position, and encode or decode the current block based on the prediction block.

Figure 10A:
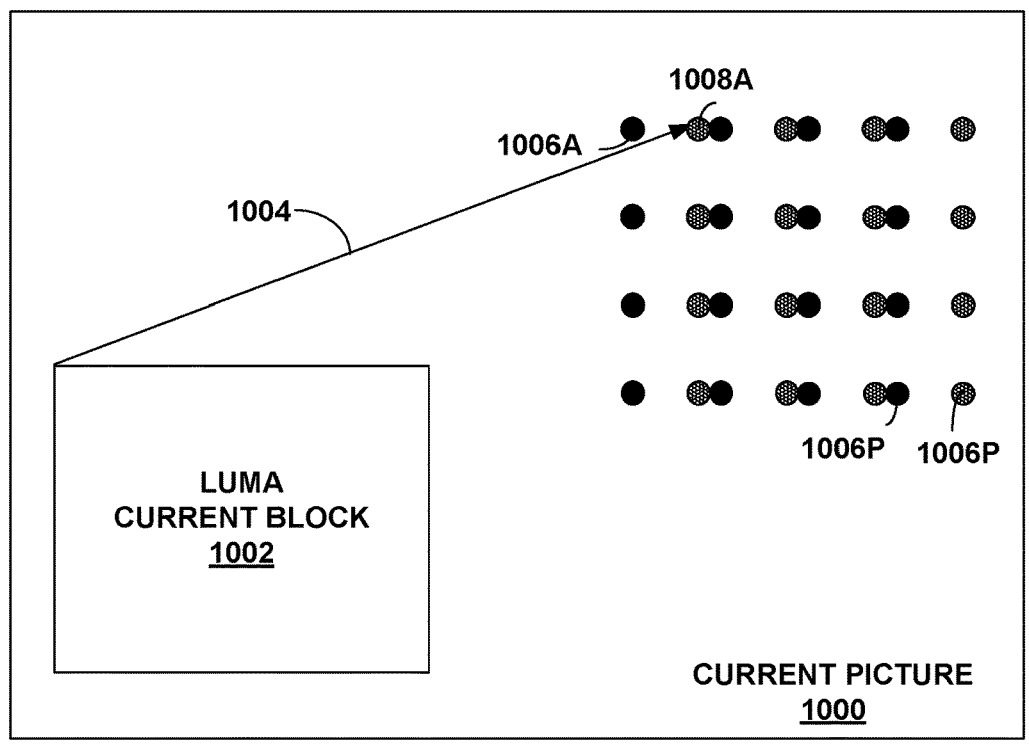
FIGS. 10A and 10B are conceptual diagrams illustrating examples of a block vector identifying a fractional-pel position and having a fractional-pel resolution.
Figure 10B:
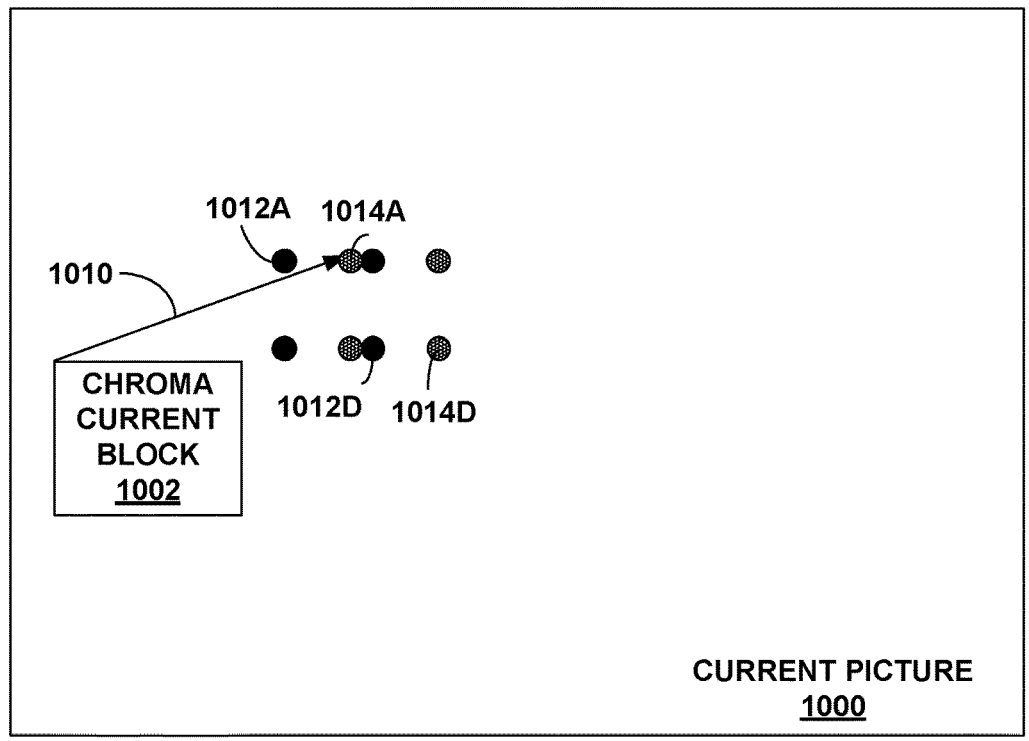

The following describes adaptive block vector resolutions. The various examples may be used together or separately. For ease, the various examples are illustrated with respect to FIGS. 10A and 10B. FIGS. 10A and 10B are conceptual diagrams illustrating examples of a block vector identifying a fractional-pel position and having a fractional-pel resolution.

In a first example, video encoder 200 and video decoder 300 may utilize block vector precision of IBC with fractional-pel resolution, such as half-pel (½), quarter-pel (¼), one-eighth-pel (⅛), or one-sixteenth-pel (1/16) block vector precision. Similar to inter precision taking reference samples from a reference picture, IBC and IntraTMP could take reference sample from the reconstructed area of current frame.

For example, video encoder 200 and video decoder 300 may determine a block vector for a current block of a current picture. Video encoder 200 and video decoder 300 may determine that that the current block is to be encoded or decoded in intra-block copy (IBC) mode or intra template matching (IntraTMP) mode. The block vector identifies a fractional-pel position between reference samples in the current picture and having a fractional-pel resolution that is less than integer-pel resolution. For instance, FIG. 10A illustrates luma current block 1002 of current picture 1000, which may be the luma component of the current block 1002. Luma current block 1002 includes block vector 1004, which may be considered as the block vector for the current block.

In FIG. 10A, current picture 1000 includes reference samples 1006A to 1006P (also called integer samples), collectively referred to as reference samples 1006. Reference samples 1006 refer to samples that are actually present in current picture 1000. That is, reference samples 1006 correspond to samples that may actually be displayed. In FIG. 10A, block vector 1004 does not point to a reference sample.

Rather, block vector 1004 points to fractional sample 1008A. In FIG. 10A, the fractional samples are illustrated as fractional samples 1008 to 1008, collectively referred to as fractional samples 1008. For example, fractional samples 1008 are located in a fractional-pel position, such as between reference samples 1006. Fractional samples 1008 are not actually present in current picture 1000, but are instead generated based on reference samples 1006. Hence, fractional-pel position refers to positions between reference samples 1006, and a position where there are no actual samples.

For block vector 1004 to point to a fractional-pel position, block vector 1004 may have a fractional-pel resolution that is less than an integer-pel resolution. Block vector 1004 has an x-coordinate and a y-coordinate, and is generally represented as <x, y>. For integer-pel resolution, x and y are both integer values. For fractional-pel resolution, x and/or y are non-integer values, and may be fractional values. For instance, for fractional-pel resolution, block vector 1004 may be (2.25, 5), where the 0.25 of the 2.25 x-coordinate represents a quarter-pel resolution. In this way, block vector 1004 identifies a fractional-pel position (e.g., position of fractional sample 1008A) between reference samples 1006 in the current picture 1000 and has a fractional-pel resolution that is less than integer-pel resolution. The above is provided as an example to assist with understanding, and should not be considered limiting.

Video encoder 200 and video decoder 300 may generate a prediction block from reference samples 1006 in the current picture 1000 based on the fractional-pel position. The prediction block that video encoder 200 and video decoder 300 generate may be considered as a group of fractional samples, including the luma component of the fractional samples (e.g., fractional samples 1008) and the chroma component of the fractional samples (e.g., fractional samples 1014, as described below).

For instance, FIG. 10B illustrates chroma current block 1002, which is the chroma component of current block 1002. Chroma current block 1002 includes block vector 1010, which may be a scaled version of block vector 1004 based on the chroma subsampling (e.g., 4:4:4, 4:2:2, or 4:2:0). Reference samples 1012A to 1012D, collectively referred to as reference samples 1012, represent the chroma reference samples. Fractional samples 1014A to 1014D, collectively referred to as fractional samples 1014, represent the chroma fractional samples.

There may be various ways in which to generate the prediction block, such as techniques based on interpolation. As one example, to generate the prediction block, video encoder 200 and video decoder 300 may interpolate utilizing an N-tap interpolation filter for luma components of the reference samples of the current picture 1000 and an M-tap interpolation filter for chroma components of the reference samples of the current picture 1000, wherein N and M are different. For example, to generate the prediction block, video encoder 200 and video decoder 300 may apply an N-tap interpolation filter to reference samples 1006 to generate fractional samples 1008, and apply an M-tap interpolation filter to reference samples 1012 to generate fractional samples 1014. The prediction block may be considered as fractional samples 1008, when referring to luma components, or may be considered as fractional samples 1014, when referring to chroma components. In some examples, the prediction block may be considered as the grouping of fractional samples 1008 and fractional samples 1014.

The N-tap interpolation filter is an 8-tap interpolation filter, and the M-tap interpolation filter is a 6-tap interpolation filter. However, other interpolation filters can be used, and the 8-tap interpolation filter for luma components, and 6-tap interpolation filter for chroma components is one examples.

For instance, the same interpolation filter as for Inter prediction is used for interpolating fractional position samples for IBC and IntraTMP. Depending on the underlying video standard, the interpolation filters could be the same ones (i.e., 8-tap and 6-tap filters for luma and 4-tap chroma) as HEVC and VVC, or the same ones (e.g., 12-tap filter for luma and 6-tap filter for chroma) as for ECM. In some examples, no extra hardware overhead may be needed to support fractional-pel block vector for IBC and IntraTMP.

As described, in one or more examples, there may be a requirement that the interpolation filtering that is used for IBC and IntraTMP be the same. For example, assume that the current block 1002 is a first block that is to be encoded or decoded in intra-block copy (IBC) mode, the current picture 1000 is a first picture, and the prediction block is a first prediction block. Video encoder 200 and video decoder 300 may determine a second block vector for a second block of a second picture, the second block vector identifying a fractional-pel position between samples in the second picture and having a fractional-pel resolution that is less than integer-pel resolution. In this example, the second block is to be encoded or decoded in intra template matching (IntraTMP) mode.

Video encoder 200 and video decoder 300 may generate a second prediction block from reference samples in the second picture based on the fractional-pel position. In this example, to generate the second prediction block, video encoder 200 and video decoder 300 may interpolate utilizing the N-tap interpolation filter for luma components of the reference samples of the second picture and the M-tap interpolation filter for chroma components of the reference samples of the second picture. That is, video encoder 200 and video decoder 300 may use the same N-tap interpolation filter for luma components of the reference samples in the second picture that video encoder 200 and video decoder 300 used on reference samples 1006 to generate fractional samples 1008. Similarly, video encoder 200 and video decoder 300 may use the same M-tap interpolation filter for chroma components of the reference samples in the second picture that video encoder 200 and video decoder 300 used on reference samples 1012 to generate fractional samples 1014.

In a second example, the interpolation filter used for IBC and IntraTMP need not align with that of the ones used in the underlying video codec. For example, 8-tap filters and 4-tap filters of VVC could be used in ECM for IBC and IntraTMP.

In a third example, depending on the adaptive motion vector resolution (AMVR) supported in a video codec, IBC and IntraTMP could support the same AMVR options for IBC AMVP mode to align with Inter prediction design. For example, HEVC support quarter-pel and integer-pel resolutions. In another example, VVC supports quarter-pel, half-pel, integer-pel and 4-pel resolutions. IBC and IntraTMP may follow the same AMVR design as for Inter prediction.

In addition, the same syntax signaling for Inter prediction AMVR may be used for IBC and IntraTMP. One example of the syntax structure is shown as follows:

Quarter pel: 0
Half pel: 1 0
Integer pel: 1 1 0
Four pel: 1 1 1

In some examples, there is no half-pel precision for IBC or IntraTMP. For example, there may be only quarter-pel, integer-pel and 4-pel resolutions supported for IBC or IntraTMP. One example of the syntax structure is shown as follows:

Quarter pel: 0
Integer pel: 1 0
Four pel: 1 1

In general, because block vector 1010 for chroma components can be derived from block vector 1004 for luma components, the example signaling for vector prediction is with reference to block vector 1004. However, it may be possible for the signaling to apply to block vector 1010.

From the above third example, for fractional-pel resolution, block vector 1004 may be limited to quarter-pel resolution, integer-pel resolution, or four-pel resolution. Four-pel resolution is a special case of integer-pel resolution, where in four-pel resolution, block vector 1004 may point to (e.g., identify) every fourth integer-pel resolution reference sample (e.g., first reference sample, fifth reference sample, ninth reference sample, and so forth).

In a fourth example, a high-level-syntax flag (e.g., it could be a sequence-level, a picture-level, a tile-level or a slice-level flag) is signaled to indicate whether full set of AMVR options (as described for techniques related to AMVR design above in the third example) could be used for IBC and IntraTMP. When the flag is true, IBC and/or IntraTMP support AMVR; otherwise, when the flag is false, they just support integer-pel resolution and/or higher ones (such as 4-pel).

Stated another way, the block vector 1004 for current 1002 identifying a fractional-pel position and having a fractional-pel resolution is not necessary in all examples. Video encoder 200 may signal and video decoder may receive a syntax element (e.g., a first syntax element) that indicates that the fractional-pel resolution is allowed for block vector 1004. Video encoder 200 may signal and video decoder 300 may receive a syntax element (e.g., a second syntax element) indicating that the block vector 1004 has the fractional-pel resolution. In this case, video encoder 200 and video decoder 300 may be considered as determining a syntax element indicating that the block vector 1004 has the fractional-pel resolution.

In some cases, fractional-pel resolution for a block vector may be disabled using the example syntax elements described above. For example, assume that the current block 1002 is a first block, the current picture 1000 is a first picture, block vector 1004 is a first block vector, and the prediction block is a first prediction block. In some examples, video encoder 200 and video decoder 300 may determine that fractional-pel is disabled for a second block vector for a second block, and truncate the second block vector to integer-pel.

In addition, in HEVC, VVC and ECM, video encoder 200 may not need to signal AMVR syntax element in bitstream when MVD are all zero for inter prediction AMVP modes. In the zero-MVD case, the AMVR configuration is set by using a default AMVR option, which is quarter-pel resolution for inter prediction AMVP modes and integer-pel for IBC. In some examples, when the aforementioned high-level-syntax flag is true, the default AMVR option for IBC and IntraTMP becomes quarter-pel resolution (that is, the same as Inter prediction AMVP modes).

That is, in some examples, video encoder 200 and video decoder 300 may determine a block vector difference (BVD) that indicates a difference between a block vector predictor for the current block 1002 and block vector 1004. As an example, for IBC mode, video encoder 200 and video decoder 300 may determine a block vector predictor (e.g., based on neighboring blocks). In IBC-AMVP mode, video encoder 200 may signal and video decoder 300 may receive the BVD. In examples where the BVD is zero, video decoder 300 may automatically determine that block vector 1004 has a quarter-pel resolution. For instance, video encoder 200 and video decoder 300 may determine that a block vector difference (BVD) between a block vector predictor for the current block 1002 and the block vector 1004 for the current block 1002 is zero. Video encoder 200 and video decoder 300 may determine that the fractional-pel resolution (e.g., of block vector 1004) is quarter-pel in the condition where the BVD is zero (i.e., when the BVD is zero).

In a fifth example, the block vector predictor inferred from neighboring no longer needs to be truncated or rounded to integer-pel resolution to construct AMVP and Merge candidate list for IBC and IntraTMP when the high-level syntax flag of the fourth example is set to be true. For IBC and IntraTMP merge modes, neighboring block vectors or motion vectors can be inserted into candidate list without truncating and/or rounding to integer-pel resolution. For IBC and IntraTMP AMVP modes, neighboring block vectors or motion vectors are rounded to the BV resolution as AMVP mode indicates before inserted in candidate list.

For example, video encoder 200 and video decoder 300 may determine block vector 1004 based on block vectors of neighboring blocks. Because block vector 1004 can have fractional-pel resolution and identify a fractional-pel position, video encoder 200 and video decoder 300 may construct a vector candidate list that includes vectors, having fractional-pel resolution, of neighboring blocks without truncating or rounding the vectors to integer-pel resolution. Video encoder 200 and video decoder 300 may determine the block vector 1004 based on the vector candidate list.

In a sixth example, in addition to or instead of the above example related to when the interpolation filter used for IBC and IntraTMP need not align with that of the ones used in the underlying video codec (e.g., the second example), the 8-tap luma filter could be as follows. These filter coefficients may be scaled up by a factor of n before use, depending on which underlying video codec is used. For example, n=1 is used for VVC and HEVC and n=4 is used for ECM (e.g., a filter coefficient that is "c" in the below 2-D array will become "n*C" before use).

```
{
  (  0,  0,   0, 64,  0,   0,  0,  0 ),
  (  0,  1,  -3, 63,  4,  -2,  1,  0 ),
  ( -1,  2,  -5, 62,  8,  -3,  1,  0 ),
  ( -1,  3,  -8, 60, 13,  -4,  1,  0 ),
  ( -1,  4, -10, 58, 17,  -5,  1,  0 ),
  ( -1,  4, -11, 52, 26,  -8,  3, -1 ),
  ( -1,  3,  -9, 47, 31, -10,  4, -1 ),
  ( -1,  4, -11, 45, 34, -10,  4, -1 ),
  ( -1,  4, -11, 40, 40, -11,  4, -1 ),
  ( -1,  4, -10, 34, 45, -11,  4, -1 ),
  ( -1,  4, -10, 31, 47,  -9,  3, -1 ),
  ( -1,  3,  -8, 26, 52, -11,  4, -1 ),
  (  0,  1,  -5, 17, 58, -10,  4, -1 ),
  (  0,  1,  -4, 13, 60,  -8,  3, -1 ),
  (  0,  1,  -3,  8, 62,  -5,  2, -1 ),
  (  0,  1,  -2,  4, 63,  -3,  1,  0 ),
};
```

In a seventh example, in addition to or instead of the above example related to when the interpolation filter used for JBC and JntraTMP need not align with that of the ones used in the underlying video codec (e.g., the second example), the 4-tap luma filter could be as follows. These filter coefficients may be scaled up by a factor of n before use, depending on which underlying video codec is used. For example, n=1 is used for VVC and HEVC and n=4 is used for ECM. In some examples, if BV and MV in a codec is stored in a finer precision than quarter-pel precision, then the fractional part in the MV and BV may be (e.g., should be) right-shifted before the below array is used in interpolation filtering process. For example, if VVC and ECM both take storage precision for MV and BV at 1/16-pel precision (which mean 4 bits after integer precision is kept for fractional precision part), then the fractional part of MV and BV may be (e.g., should be) right-shifted by 2 before interpolation filtering process.

{
( 0, 64, 0, 0 ),
( −4, 54, 16, −2 ),
( −4, 36, 36, −4 ),
( −2, 16, 54, −4 ),
};

In an eighth example, when the high-level-syntax flag (e.g., it could be a sequence-level, a picture-level, a tile-level or a slice-level flag) is signaled as 0 to indicate additional AMVR options for fractional-pel precisions could not be used for IBC and/or IntraTMP (e.g., as disclosed in above techniques for the third, fifth, and/or sixth examples), the fractional part in a BV is truncated to zero before the BV is used to locate reference samples in the current frame.

In a ninth example, another high-level flag (e.g., at sequence level, picture level, tile level or slice level) may be signaled in bitstream for Inter slices (e.g., slices that are inter-predicted) to indicate whether fractional-pel AMVR modes could be used. When the flag value is 1, the same AMVR function as for VVC and ECM remains unchanged. Otherwise, when the flag value is 0, the fractional part in a MV of an inter-block (e.g., a block that is inter-predicted) is truncated to zero before MV is used to locate reference samples in corresponding reference frame(s) for the inter-block. That is, video encoder 200 and video decoder 300 may determine that fractional-pel is disabled for a second block vector for a second block, and truncate the second block vector to integer-pel.

The following describes availability check for block vectors. The following examples may be performed separately or in combination, including in combination with the above examples.

Figure 5:
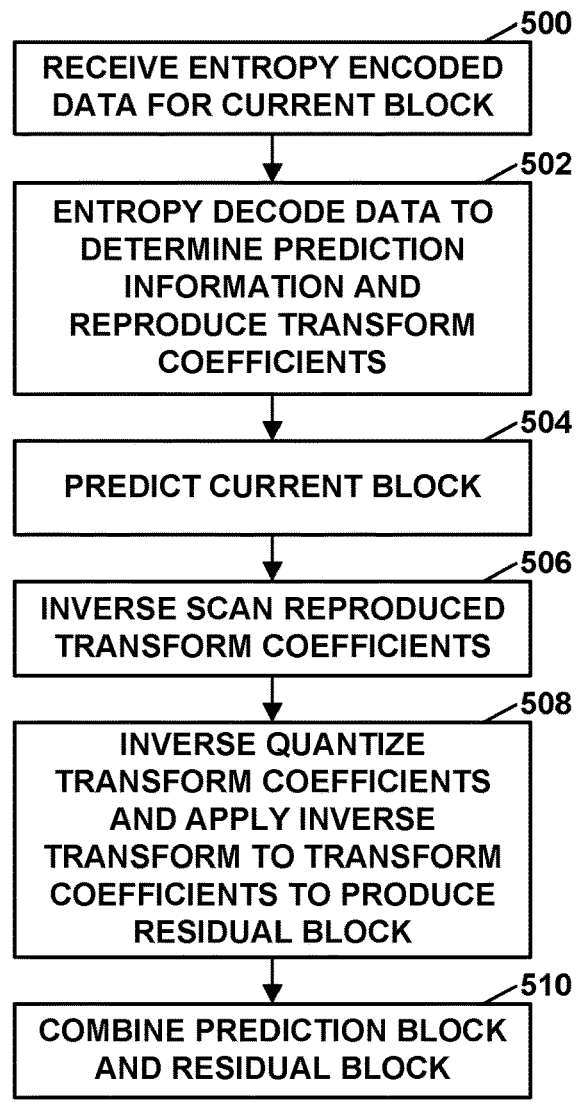
FIG. 5 is a flowchart illustrating an example method for decoding a current block in accordance with the techniques of this disclosure.

In one or more examples, a valid block vector is defined by whether all the required reference samples pointed to by the block vector are sitting inside the coded/reconstructed area of the current frame. Some video codecs may not make whole frames serve as a reference picture for IBC and IntraTMP. In some techniques, the accepted area may be constrained such as, current CTU plus the CTU to the left of the current one, current CTU row or current CTU row plus a few CTU rows above the current CTU row. Thus, when constrained area is imposed on the coded/reconstructed area of the current frame, the definition of a valid block vector becomes that all the required reference samples pointed to by the block vector are all sitting inside the constrained area of the current frame. In a special case, the constrained area could also be the whole coded/reconstructed area of the current frame. For instance, FIG. 5 illustrates that the entire picture, other than the non-coded area, can be a reference for determining a prediction block for the current block.

In one or more examples, the definition of required reference samples is that the interpolation process requires all these samples to form the prediction signals or an IBC and an IntraTMP block. For a W×H block, if the block vector points exactly to an integer position on the constrained area, then the required reference samples are an area of samples of size W×H pointed to by a block vector. If the block pointed to a fraction-pel position on the constrained area, then the required samples could vary depending on the interpolation used. Assuming a M-tap filter is used for horizontal interpolation and N-tap filer is used for vertical interpolation (e.g., M and N are typically 2, 4, 6, 8, 10, 12, and M could be set identical to N), the required reference samples are defined as follows:

When both BVx and BVy point to fractional-pel positions, the required reference samples are an area of samples of size (W+M−1)×(H+N−1) pointed to by the block vector (BVx−(((M/2)−1)<<r), BVy−(((N/2)−1)<<r)), where r is the log 2-scale storage precision for BV and MV, e.g., 2 in HEVC and 4 in VVC and ECM.

When only BVx points to fractional position while BVy does not, the required reference samples are an area of samples of size (W+M−1)×H pointed to by the block vector (BVx−(((M/2)−1)<<r), BVy).

When only BVy points to fractional position while BVx does not, the required reference samples are an area of samples of size W×(H+N−1) pointed to by the block vector (BVx, BVy−(((N/2)−1)<<r)).

In one or more examples, there are multiple ways to handle invalid BVs, as follows. In one example, BV could be rounded or truncated to integer precision to force it pointing to an integer position on the current frame. If some of the required reference samples are still outside the constrained area of the current frame, then the BV is considered invalid. Otherwise, if the required reference samples are all sitting within the constrained area of the current frame, then the truncated or rounded BV replaces the invalid one and is used to form IBC and IntraTMP prediction block. The rounded or truncated BV is stored in motion field for subsequent CU's BV or MV prediction. In yet another example, the invalid BV is still used to be store into motion field and could be used for subsequent CU's BV or MV prediction.

In one or more examples, it could be the case that only one of the horizontal and vertical components of an invalid BV is truncated or rounded to get a valid one. For example, assuming an invalid block vector is (BVx, BVy), r is the log 2-scale storage precision as aforementioned for BV or MV and "o" is the rounding offset, then three additional BV's area considered to be candidates to replace the invalid BV:
(BVx, ((BVy+o)>>r)<<r)
(((BVx+o)>>r)<<r, BVy)
(((BVx+o)>>r)<<r, ((BVy+o)>>r)<<r)
A zero "o" is used for BV truncation; a non-zero "o" is used for BV rounding and its typical value is $2^{r-1}$.

In one example, a shorter interpolation filter may be applied to replace both or either one of the filters used respectively for horizontal and vertical interpolation. Specifically, horizontal filter could be a M-tap filter and vertical one could be a N-tap filter, where they are the same value at the beginning and denoted as (M, N) for simplicity. BV validity check is based on the following process:

For $m = M, M - 2, M - 4, \ldots, 2, 0$:

For $n = N, N - 2, N - 4, \ldots, 2, 0$:

Do BV validity check based on embodiment [0135] with (m, n).

If BV could be valid with (m,n):

Leave the process with retuning that BV is valid with (m, n).

Leave the process with returning that BV is not valid.

It is noted some (m, n) may be skipped in the above process when there is either no m-tap filter or n-tap interpolation supported in a codec.

In another example, based on the above-mentioned examples, the value of M and N could be forced to be identical to reduce the solution space of (m, n). For example, the process can be described as follows with L=min(M, N):

For $(m, n) = (L, L), (L - 2, L - 2), \ldots, (2, 2), (0, 0)$:

Do BV validity check based on embodiment [0135] with (m, n).

If BV could be valid with (m,n):

Leave the process with retuning that BV is valid with (m, n).

Leave the process with returning that BV is not valid.

It is noted some (m, n) may be skipped in the above process when there is either no m-tap filter or n-tap interpolation supported in a codec.

In one or more examples, the value of M and N for interpolation filters could be further adjusted based on the luma and chroma interpolation filters. For simplicity, ($M_L$, $N_L$) are for representing $M_L$-tap and $N_L$-tap interpolation filters are used for luma samples, ($M_C$, $N_C$) are for the denoting $M_C$-tap and $N_C$-tap interpolation filters are used for chroma samples, and then the following applies:

(M, N)=(max($M_L$, $M_C$), max($N_L$, $N_C$)) for 4:4:4 format (M, N)=(max($M_L$, 2*$M_C$), max($N_L$, $N_C$)) for 4:2:2 format (M, N)=(max($M_L$, 2*$M_C$), max($N_L$, 2*$N_C$)) for 4:2:0 format (M, N)=($M_L$, $N_L$) for non-dual tree case in VVC and ECM, or 4:0:0 format Then, BV validity check is performed with (M, N) using above-mentioned embodiments.

In one or more examples, the use of a 6-tap interpolation filter (such as VVC's and ECM'S) may be store in motion field and inferred for subsequent block. For example, VVC supports a 6-tap interpolation filter for half-pel AMVR case. This information is also stored in motion field and may be inferred by subsequent CU's.

In one or more examples, the interpolation filter used to generate the reference template of IBC (for ARMC reordering or template matching) could be the same as the one used for Inter prediction or shorted ones, such as bilinear filter). For example, ARMC has to check the validity for each BV in its merge candidate list. When a candidate is found to be an invalid BV, its TM cost is set to a maximum value before reordering takes place. As another example, during templating matching process, BV validity check has to be done on each position that TM search, in order to avoid deriving a potentially invalid BV from TM search.

In some examples for IBC mode, video encoder 200 and video decoder 300 may determine an initial block vector, and may then perform refinement to determine block vector 1004. In some examples, to perform refinement, video encoder 200 and video decoder 300 may compare templates of current block 1002 (e.g., above and left samples) to reference templates that include interpolated samples in current picture 1000. In one or more examples, for the purposes of refinement, to generate the reference templates, video encoder 200 and video decoder 300 may perform bilinear filtering (e.g., perform bilinear filtering using reference samples 1006 or reference samples 1012 of FIGS. 10A and 10B). Based on the reference template with the least cost (e.g., lowest error), video encoder 200 and video decoder 300 may determine block vector 1004. Then, for generating the prediction block, video encoder 200 and video decoder 300 may apply the N-tap filter for luma component and the M-tap filter for chroma component as described above.

Similarly, for IntraTMP, for template matching purposes, video encoder 200 and video decoder 300 may generate templates using bilinear filtering. Then, once video encoder 200 and video decoder 300 determine block vector 1004, for generating the prediction block, video encoder 200 and video decoder 300 may apply the N-tap filter for luma component and the M-tap filter for chroma component as described above.

In this way, to determine block vector 1004, video encoder 200 and video decoder 300 may apply bilinear filtering to generate reference templates in the current picture 1000. Video encoder 200 and video decoder 300 may determine the block vector 1004 based on the reference templates. For example, video encoder 200 and video decoder 300 may determine costs between current template and reference templates, and based on lowest cost, determine block vector 1004. Then, video encoder 200 and video decoder 300 may determine the prediction block using N-tap filtering for luma components, and M-tap filtering for chroma components.

Figure 2:
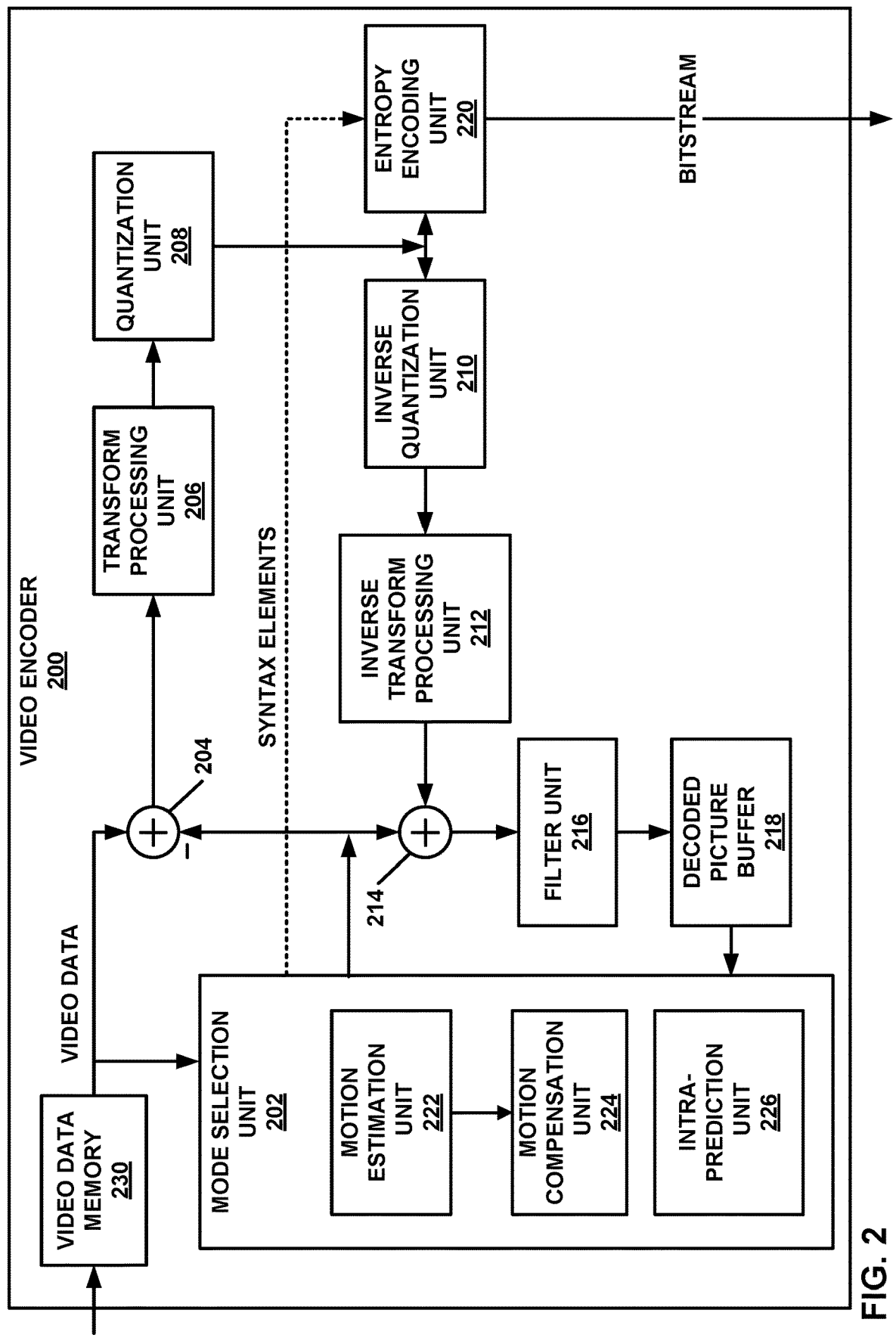
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision (e.g., fractional-pel resolution), motion compensation unit 224 may interpolate values for the prediction block according to one or more interpolation filters. Moreover, for bi-directional inter-prediction, motion compensation unit 224 may retrieve data for two reference blocks by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

As part of a reconstruction loop, inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a block vector for a current block of a current picture, the block vector identifying a fractional-pel position between samples in the current picture and having a fractional-pel resolution that is less than integer-pel resolution, generate a prediction block from reference samples in the current picture based on the fractional-pel position, and encode the current block based on the prediction block.

Figure 3:
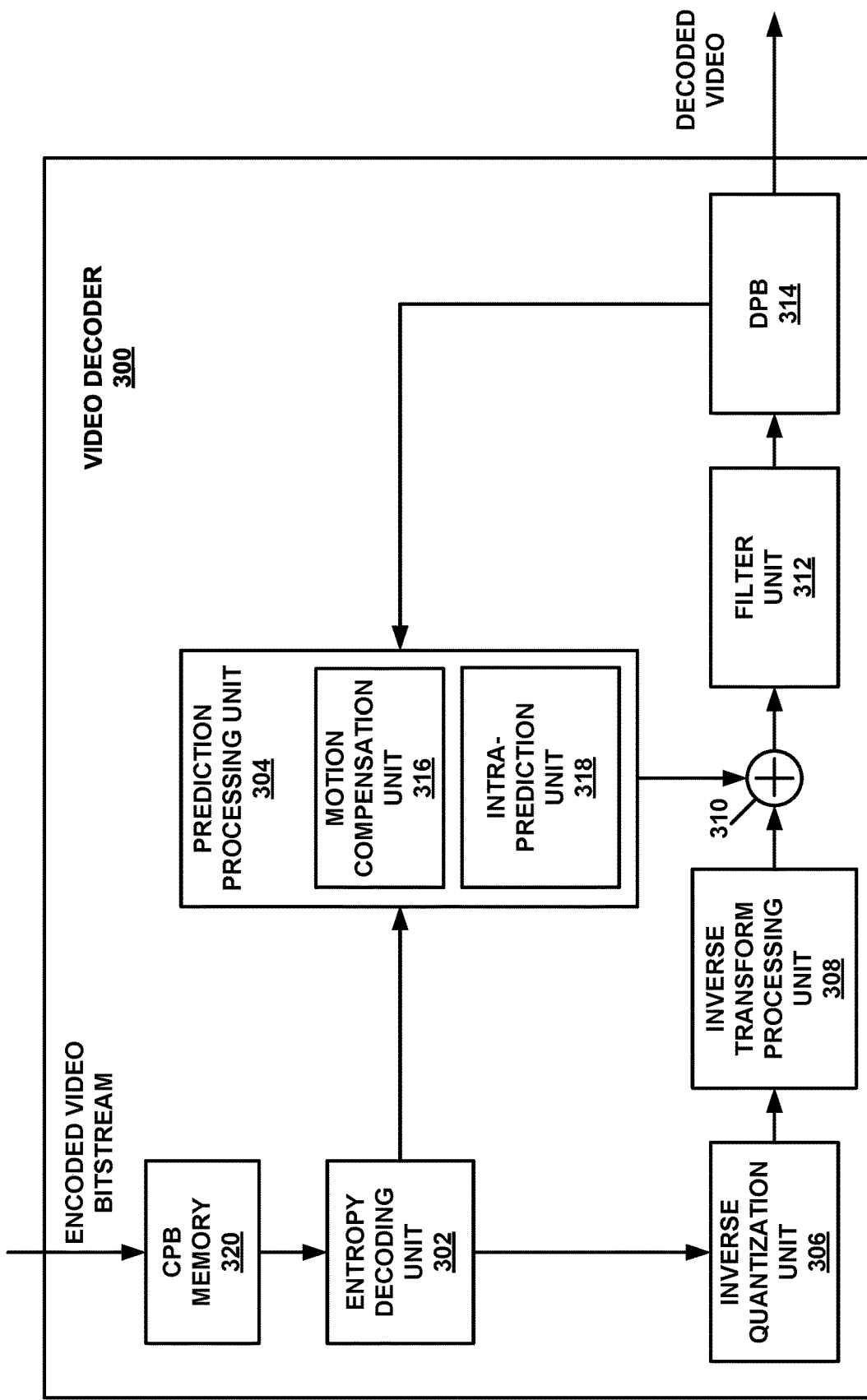
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1. In this manner, video decoder 300 represents an example of a video decoding device including a memory configured to store video data, and one or more processing units implemented in circuitry and configured to determine a block vector for a current block of a current picture, the block vector identifying a fractional-pel position between samples in the current picture and having a fractional-pel resolution that is less than integer-pel resolution, generate a prediction block from reference samples in the current picture based on the fractional-pel position, and decode the current block based on the prediction block.

Figure 4:
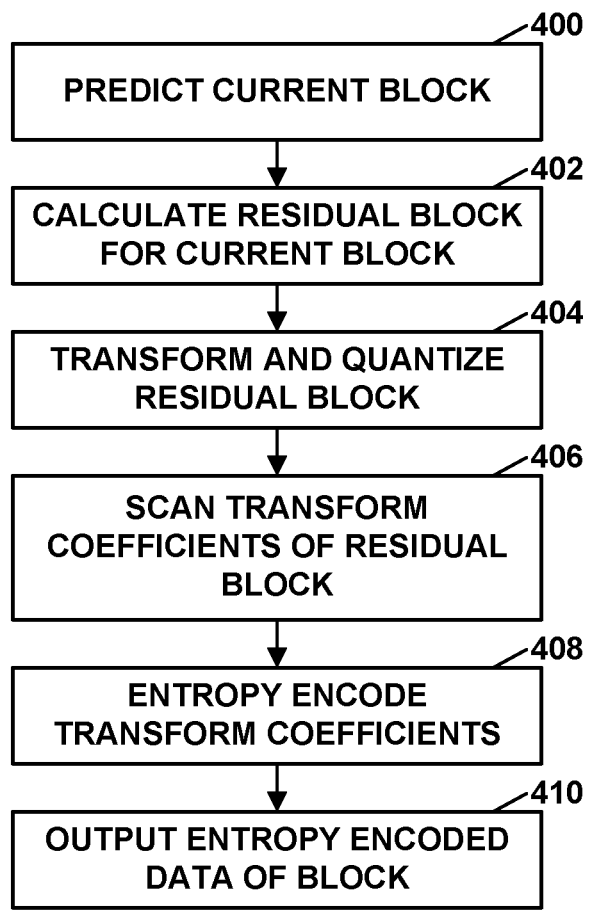
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may be or include a current CU. Although described with respect to video encoder 200 (FIGS. 1 and 2), it should be understood that other devices may be configured to perform a method similar to that of FIG. 4.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

FIG. 5 is a flowchart illustrating an example method for decoding a current block of video data in accordance with the techniques of this disclosure. The current block may be or include a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

Figure 11:
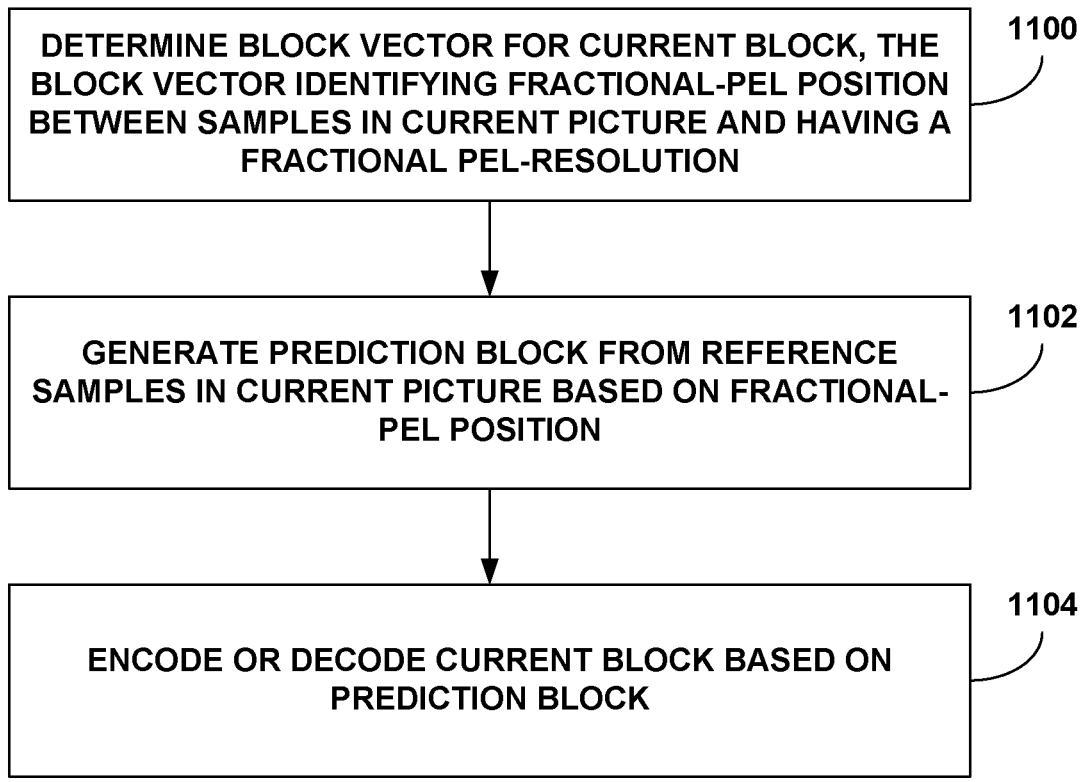
FIG. 11 is a flowchart illustrating an example method of encoding or decoding video data in accordance with the techniques described in this disclosure.

FIG. 11 is a flowchart illustrating an example method of encoding or decoding video data in accordance with the techniques described in this disclosure. For ease of explanation, the example of FIG. 11 is described with respect to processing circuitry. Examples of the processing circuitry include processing circuitry of video encoder 200 and video decoder 300. The processing circuitry may be coupled to memory, such as memory 106, memory 120, video data memory 230, DPB 218, CPB memory 320, DPB 314, or other memory. Also, for illustration purposes only, reference is made to FIGS. 10A and 10B.

The processing circuitry may be configured to determine a block vector 1004 for a current block 1002 of a current picture 1000, the block vector 1004 identifying a fractional-pel position between reference samples 1006 in the current picture 1000 and having a fractional-pel resolution that is less than integer-pel resolution (1100). The processing circuitry may determine that current block 1002 is to be encoded or decoded in intra-block copy (IBC) mode or intra template matching (IntraTMP) mode (e.g., where block vectors are used).

There may be various ways in which the processing circuitry may determine the block vector 1004. For instance, the processing circuitry may signal or receive a syntax element that indicates that the fractional-pel resolution is allowed for the block vector 1004. In some examples, for a second block (e.g., different than current block 1002), video encoder 200 and video decoder 300 may determine that fractional-pel is disabled for a second block vector for a second block, and truncate the second block vector to integer-pel.

The processing circuitry may construct a vector candidate list that includes vectors, having fractional-pel resolution, of neighboring blocks without truncating or rounding the vectors to integer-pel resolution, and determine the block vector based on the vector candidate list. In some examples, the processing circuitry may determine that a block vector difference (BVD) between a block vector predictor for the current block 1002 and the block vector 1004 for the current block 1002 is zero. In this example, the processing circuitry may determine that the fractional-pel resolution is quarter-pel in the condition where the BVD is zero (i.e., when the BVD is zero).

In some examples, the processing circuitry may apply bilinear filtering to generate reference templates in the current picture, and determine the block vector based on the reference templates (e.g., based on lowest difference between reference templates and current template). The processing circuitry perform such operations as part of block vector refinement for IBC mode, or for intraTMP. However, for then generating the prediction block, the processing circuitry may use other interpolation filtering techniques, other than bilinear filtering.

For example, the processing circuitry may generate a prediction block from reference samples in the current picture 1002 based on the fractional-pel position (e.g., identified fractional-pel position) (1102). As an example, the processing circuitry may generate luma components of the prediction block (e.g., fractional samples 1008) from reference samples 1006 (FIG. 10A), and generate chroma components of the prediction block (e.g., fractional samples 1014) from reference samples 1012 (FIG. 10B).

To generate the prediction block, the processing circuitry may be configured to interpolate utilizing an N-tap interpolation filter for luma components of the reference samples 1006 of the current picture 1002 and an M-tap interpolation filter for chroma components of the reference samples 1012 of the current picture 1002. N and M are different. For example, the N-tap interpolation filter comprises an 8-tap interpolation filter, and the M-tap interpolation filter comprises a 6-tap interpolation filter.

In some examples, the N-tap information filter and the M-tap interpolation filter used for IBC mode may be the same as the N-tap information filter and the M-tap interpolation filter used for IntraTMP mode. For instance, assume that the current block 1002 is a first block that is to be encoded or decoded in intra-block copy (IBC) mode, the current picture 1000 is a first picture, and the prediction block is a first prediction block.

The processing circuitry may be configured to determine a second block vector for a second block of a second picture, the second block vector identifying a fractional-pel position between samples in the second picture and having a fractional-pel resolution that is less than integer-pel resolution. The second block is to be encoded or decoded in intra template matching (IntraTMP) mode. The processing circuitry may generate a second prediction block from reference samples in the second picture based on the fractional-pel position. In this example, to generate the second prediction block, the processing circuitry may interpolate utilizing the N-tap interpolation filter for luma components of the reference samples of the second picture and the M-tap interpolation filter for chroma components of the reference samples of the second picture. The processing circuitry may encode or decode the second block based on the second prediction block similar to the techniques described with respect to current block 1002.

For instance, the processing circuitry may encode or decode the current block 1002 based on the prediction block (1104). For example, for decoding, the processing circuitry may receive residual information indicative of a difference between the prediction block and the current block 1002 (e.g., for the luma and chroma components), and sum the residual information with the prediction block to reconstruct the current block 1002. In some examples, the processing circuitry may perform the decoding of the current block 1002 as part of a reconstruction loop of video encoder 200. For encoding, the processing circuitry may determine residual information indicative of a difference between the prediction block and the current block 1002. The processing circuitry may signal the residual information, and signal information for determining the block vector.

The following numbered clauses illustrate one or more aspects of the devices and techniques described in this disclosure.

Clause 1. A method of encoding or decoding video data, the method comprising: determining a block vector for a current block of a current picture, the block vector identifying a fractional-pel position between samples in the current picture and having a fractional-pel resolution that is less than integer-pel resolution; generating a prediction block from reference samples in the current picture based on the identified fractional-pel position; and encoding or decoding the current block based on the prediction block.

Clause 2. The method of clause 1, further comprising: determining that the current block is to be encoded or decoded in intra-block copy (IBC) or intra template matching (IntraTMP) mode.

Clause 3. The method of any of clauses 1 and 2, further comprising: determining a syntax element indicating that the block vector has the fractional-pel resolution.

Clause 4. The method of any of clauses 1-3, wherein generating the prediction block comprises interpolating utilizing 8-tap interpolation filters for luma components of the reference samples of the current picture and 4-tap interpolation filters for chroma components of the reference samples of the current picture.

Clause 5. The method of any of clauses 1-3, wherein generating the prediction block comprises interpolating utilizing 12-tap interpolation filters for luma components of the reference samples of the current picture and 6-tap interpolation filters for chroma components of the reference samples of the current picture.

Clause 6. The method of any of clauses 4 and 5, wherein utilizing the 8-tap interpolation filters, the 4-tap interpolation filters, the 12-tap interpolation filters, or the 6-tap interpolation filters comprises: determining a video codec type for encoding or decoding the video data; and scaling filter coefficients based on the determined video codec type.

Clause 7. The method of any of clauses 1-6, further comprising: determining that one or more adaptive motion vector resolution (AMVR) mode options are unavailable for intra-block copy (IBC) or intra template matching (IntraTMP) mode, wherein determining the block vector comprises truncating to zero a fractional part of the block vector.

Clause 8. The method of any of clauses 1-7, wherein determining the block vector comprises: constructing a vector candidate list that includes vectors, having fractional-pel resolution, of neighboring blocks without truncating or rounding the vectors to integer-pel resolution; and determining the block vector based on candidate list.

Clause 9. The method of any of clauses 1-8, wherein generating the prediction block comprises: determining whether a horizontal component of the block vector and a vertical component of the block vector identify respective fractional-pel positions; and determining the reference samples for generating the prediction block based on the determination of whether the horizontal component of the block vector and the vertical component of the block vector identify respective fractional-pel positions.

Clause 10. The method of any of clauses 1-9, wherein encoding or decoding the current block comprises decoding the current block, wherein decoding the current block comprises: receiving residual information indicative of a difference between the prediction block and the current block; and summing the residual information with the prediction block to reconstruct the current block.

Clause 11. The method of clause 10, wherein decoding the current block comprises decoding the current block as part of a reconstruction loop of a video encoder.

Clause 12. The method of any of clauses 1-9, wherein encoding or decoding the current block comprises encoding the current block, wherein encoding the current block comprises: determining residual information indicative of a difference between the prediction block and the current block; signaling the residual information; and signaling information for determining the block vector.

Clause 13. A device for encoding or decoding video data, the device comprising: memory configured to store the video data; and processing circuitry coupled to the memory and configured to perform the method of any of clauses 1-10.

Clause 14. The device of clause 13, further comprising a display configured to display decoded video data.

Clause 15. The device of any of clauses 13 and 14, wherein the device comprises one or more of a camera, a computer, a mobile device, a broadcast receiver device, or a set-top box.

Clause 16. A computer-readable storage medium having stored thereon instructions that, when executed, cause one or more processors to perform the method of any of clauses 1-12.

Clause 17. A device for encoding or decoding video data, the device comprising means for perform the method of any of clauses 1-12.

Clause 1A. A method of encoding or decoding video data, the method comprising: determining a block vector for a current block of a current picture, the block vector identifying a fractional-pel position between reference samples in the current picture and having a fractional-pel resolution that is less than integer-pel resolution; generating a prediction block from reference samples in the current picture based on the fractional-pel position; and encoding or decoding the current block based on the prediction block.

Clause 2A. The method of clause 1A, further comprising: determining that the current block is to be encoded or decoded in intra-block copy (IBC) mode or intra template matching (IntraTMP) mode, wherein determining the block vector comprises determining the block vector when the current block is to be encoded or decoded in the IBC mode or the IntraTMP mode.

Clause 3A. The method of any of clauses 1A and 2A, wherein generating the prediction block comprises interpolating utilizing an N-tap interpolation filter for luma components of the reference samples of the current picture and an M-tap interpolation filter for chroma components of the reference samples of the current picture, wherein N and M are different.

Clause 4A. The method of clause 3A, wherein the N-tap interpolation filter comprises an 8-tap interpolation filter, and the M-tap interpolation filter comprises a 6-tap interpolation filter.

Clause 5A. The method of any of clauses 3A and 4A, wherein the current block is a first block that is to be encoded or decoded in intra-block copy (IBC) mode, wherein the current picture is a first picture, wherein the fractional-pel position is a first fractional-pel position and the fractional-pel resolution is a first fractional-pel resolution, and wherein the prediction block comprises a first prediction block, the method further comprising: determining a second block vector for a second block of a second picture, the second block vector identifying a second fractional-pel position between samples in the second picture and having a second fractional-pel resolution that is less than integer-pel resolution, wherein the second block is to be encoded or decoded in intra template matching (IntraTMP) mode; generating a second prediction block from reference samples in the second picture based on the second fractional-pel position, wherein generating the second prediction block comprises interpolating utilizing the N-tap interpolation filter for luma components of the reference samples of the second picture and the M-tap interpolation filter for chroma components of the reference samples of the second picture; and encoding or decoding the second block based on the second prediction block.

Clause 6A. The method of any of clauses 1A-5A, further comprising: signaling or receiving a syntax element that indicates that the fractional-pel resolution is allowed for the block vector.

Clause 7A. The method of any of clauses 1A-6A, further comprising: determining that a block vector difference (BVD) between a block vector predictor for the current block and the block vector for the current block is zero; and determining that the fractional-pel resolution is quarter-pel when the BVD is zero.

Clause 8A. The method of any of clauses 1A-7A, wherein determining the block vector comprises: constructing a vector candidate list that includes vectors, having fractional-pel resolution, of neighboring blocks without truncating or rounding the vectors to integer-pel resolution; and determining the block vector based on the vector candidate list.

Clause 9A. The method of any of clauses 1A-8A, wherein the current block is a first block, wherein the current picture is a first picture, wherein the block vector comprises a first block vector, and wherein the prediction block comprises a first prediction block, the method further comprising: determining that fractional-pel is disabled for a second block vector for a second block; and truncating the second block vector to integer-pel.

Clause 10A. The method of any of clauses 1A-9A, wherein determining the block vector comprises: applying bilinear filtering to generate reference templates in the current picture; and determining the block vector based on the reference templates.

Clause 11A. The method of any of clauses 1A-10A, wherein encoding or decoding the current block comprises decoding the current block, wherein decoding the current block comprises: receiving residual information indicative of a difference between the prediction block and the current block; and summing the residual information with the prediction block to reconstruct the current block.

Clause 12A. The method of clause 11A, wherein decoding the current block comprises decoding the current block as part of a reconstruction loop of a video encoder.

Clause 13A. The method of any of clauses 1A-10A, wherein encoding or decoding the current block comprises encoding the current block, wherein encoding the current block comprises: determining residual information indicative of a difference between the prediction block and the current block; signaling the residual information; and signaling information for determining the block vector.

Clause 14A. A device for encoding or decoding video data, the device comprising: one or more memories configured to store the video data; and processing circuitry coupled to the one or more memories, wherein the processing circuitry is configured to: determine a block vector for a current block of a current picture of the video data, the block vector identifying a fractional-pel position between reference samples in the current picture and having a fractional-pel resolution that is less than integer-pel resolution; generate a prediction block from reference samples in the current picture based on the fractional-pel position; and encode or decode the current block based on the prediction block.

Clause 15A. The device of clause 14A, wherein the processing circuitry is configured to: determine that the current block is to be encoded or decoded in intra-block copy (IBC) mode or intra template matching (IntraTMP) mode, wherein to determine the block vector, the processing circuitry is configured to determine the block vector when the current block is to be encoded or decoded in the IBC mode or the IntraTMP mode.

Clause 16A. The device of any of clauses 14A and 15A, wherein to generate the prediction block, the processing circuitry is configured to interpolate utilizing an N-tap interpolation filter for luma components of the reference samples of the current picture and an M-tap interpolation filter for chroma components of the reference samples of the current picture, wherein N and M are different.

Clause 17A. The device of clause 16A, wherein the N-tap interpolation filter comprises an 8-tap interpolation filter, and the M-tap interpolation filter comprises a 6-tap interpolation filter.

Clause 18A. The device of any of clauses 16A and 17A, wherein the processing circuitry is configured to: signal or receive a syntax element that indicates that the fractional-pel resolution is allowed for the block vector.

Clause 19A. The device of any of clauses 14A-18A, wherein to determine the block vector, the processing circuitry is configured to: apply bilinear filtering to generate reference templates in the current picture; and determine the block vector based on the reference templates.

Clause 20A. A computer-readable storage medium storing instructions thereon that when executed cause one or more processors to: determine a block vector for a current block of a current picture, the block vector identifying a fractional-pel position between reference samples in the current picture and having a fractional-pel resolution that is less than integer-pel resolution; generate a prediction block from reference samples in the current picture based on the fractional-pel position; and encode or decode the current block based on the prediction block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:
    determining a block vector for a current block of a current picture, the block vector identifying a fractional-pel position between reference samples in the current picture and having a fractional-pel resolution that is less than integer-pel resolution;
    determining that a block vector difference (BVD) between a block vector predictor for the current block and the block vector for the current block is zero;
    determining that the fractional-pel resolution is quarter-pel when the BVD is zero;
    generating a prediction block from reference samples in the current picture based on the fractional-pel position; and
    encoding or decoding the current block based on the prediction block.

2. The method of claim 1, further comprising:
    determining that the current block is to be encoded or decoded in intra-block copy (IBC) mode or intra template matching (IntraTMP) mode,
    wherein determining the block vector comprises determining the block vector when the current block is to be encoded or decoded in the IBC mode or the IntraTMP mode.

3. The method of claim 1, wherein generating the prediction block comprises interpolating utilizing an N-tap interpolation filter for luma components of the reference samples of the current picture and an M-tap interpolation filter for chroma components of the reference samples of the current picture, wherein N and M are different.

4. The method of claim 3, wherein the N-tap interpolation filter comprises an 8-tap interpolation filter, and the M-tap interpolation filter comprises a 6-tap interpolation filter.

5. The method of claim 3, wherein the current block is a first block that is to be encoded or decoded in intra-block copy (IBC) mode, wherein the fractional-pel position is a first fractional-pel position and the fractional-pel resolution is a first fractional-pel resolution, wherein the current picture is a first picture, and wherein the prediction block comprises a first prediction block, the method further comprising:
    determining a second block vector for a second block of a second picture, the second block vector identifying a second fractional-pel position between samples in the second picture and having a second fractional-pel resolution that is less than integer-pel resolution, wherein the second block is to be encoded or decoded in intra template matching (IntraTMP) mode;
    generating a second prediction block from reference samples in the second picture based on the second fractional-pel position, wherein generating the second prediction block comprises interpolating utilizing the N-tap interpolation filter for luma components of the reference samples of the second picture and the M-tap interpolation filter for chroma components of the reference samples of the second picture; and
    encoding or decoding the second block based on the second prediction block.

6. The method of claim 1, further comprising:
    signaling or receiving a syntax element that indicates that the fractional-pel resolution is allowed for the block vector.

7. The method of claim 1, wherein determining the block vector comprises:
    constructing a vector candidate list that includes vectors, having fractional-pel resolution, of neighboring blocks without truncating or rounding the vectors to integer-pel resolution; and
    determining the block vector based on the vector candidate list.

8. The method of claim 1, wherein the current block is a first block, wherein the current picture is a first picture, wherein the block vector comprises a first block vector, and wherein the prediction block comprises a first prediction block, the method further comprising:
    determining that fractional-pel is disabled for a second block vector for a second block; and
    truncating the second block vector to integer-pel.

9. The method of claim 1, wherein determining the block vector comprises:
    applying bilinear filtering to generate reference templates in the current picture; and
    determining the block vector based on the reference templates.

10. The method of claim 1, wherein encoding or decoding the current block comprises decoding the current block, wherein decoding the current block comprises:
    receiving residual information indicative of a difference between the prediction block and the current block; and
    summing the residual information with the prediction block to reconstruct the current block.

11. The method of claim 10, wherein decoding the current block comprises decoding the current block as part of a reconstruction loop of a video encoder.

12. The method of claim 1, wherein encoding or decoding the current block comprises encoding the current block, wherein encoding the current block comprises:
    determining residual information indicative of a difference between the prediction block and the current block;
    signaling the residual information; and
    signaling information for determining the block vector.

13. A device for encoding or decoding video data, the device comprising:
    one or more memories configured to store the video data; and
    processing circuitry coupled to the one or more memories, wherein the processing circuitry is configured to:
        determine a block vector for a current block of a current picture of the video data, the block vector identifying a fractional-pel position between reference samples in the current picture and having a fractional-pel resolution that is less than integer-pel resolution;
        determine that a block vector difference (BVD) between a block vector predictor for the current block and the block vector for the current block is zero;
        determine that the fractional-pel resolution is quarter-pel when the BVD is zero;
        generate a prediction block from reference samples in the current picture based on the fractional-pel position; and
        encode or decode the current block based on the prediction block.

14. The device of claim 13, wherein the processing circuitry is configured to:
    determine that the current block is to be encoded or decoded in intra-block copy (IBC) mode or intra template matching (IntraTMP) mode,
    wherein to determine the block vector, the processing circuitry is configured to determine the block vector when the current block is to be encoded or decoded in the IBC mode or the Intra TMP mode.

15. The device of claim 13, wherein to generate the prediction block, the processing circuitry is configured to interpolate utilizing an N-tap interpolation filter for luma components of the reference samples of the current picture and an M-tap interpolation filter for chroma components of the reference samples of the current picture, wherein N and M are different.

16. The device of claim 15, wherein the N-tap interpolation filter comprises an 8-tap interpolation filter, and the M-tap interpolation filter comprises a 6-tap interpolation filter.

17. The device of claim 15, wherein the processing circuitry is configured to:
    signal or receive a syntax element that indicates that the fractional-pel resolution is allowed for the block vector.

18. The device of claim 13, wherein to determine the block vector, the processing circuitry is configured to:
    apply bilinear filtering to generate reference templates in the current picture; and
    determine the block vector based on the reference templates.

19. A non-transitory computer-readable storage medium storing instructions thereon that when executed cause one or more processors to:
    determine a block vector for a current block of a current picture, the block vector identifying a fractional-pel position between reference samples in the current picture and having a fractional-pel resolution that is less than integer-pel resolution;

determine that a block vector difference (BVD) between a block vector predictor for the current block and the block vector for the current block is zero;

determine that the fractional-pel resolution is quarter-pel when the BVD is zero;

generate a prediction block from reference samples in the current picture based on the fractional-pel position; and encode or decode the current block based on the prediction block.

* * * * *